US012039970B1

(12) United States Patent
Sieracki

(10) Patent No.: US 12,039,970 B1
(45) Date of Patent: *Jul. 16, 2024

(54) SYSTEM AND METHOD FOR SOURCE AUTHENTICATION IN VOICE-CONTROLLED AUTOMATION

(71) Applicant: REALITY ANALYTICS, INC., Columbia, MD (US)

(72) Inventor: Jeffrey Sieracki, Silver Spring, MD (US)

(73) Assignee: Renesas Electronics America, San Jose, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 17/877,166

(22) Filed: Jul. 29, 2022

Related U.S. Application Data

(63) Continuation of application No. 17/080,550, filed on Oct. 26, 2020, now Pat. No. 11,437,019.

(60) Provisional application No. 62/925,457, filed on Oct. 24, 2019.

(51) Int. Cl.
| | | |
|---|---|---|
| *G10L 15/00* | (2013.01) | |
| *G10L 15/02* | (2006.01) | |
| *G10L 15/22* | (2006.01) | |
| *G10L 17/00* | (2013.01) | |
| *G10L 17/06* | (2013.01) | |

(52) U.S. Cl.
CPC .............. *G10L 15/02* (2013.01); *G10L 15/22* (2013.01); *G10L 17/00* (2013.01); *G10L 17/06* (2013.01)

(58) Field of Classification Search
CPC ......... G10L 15/07; G10L 15/20; G10L 15/22; G10L 15/30; G10L 15/26; G10L 15/1502; G10L 15/063; G10L 15/16; G10L 25/30; G10L 25/78; G10L 25/87; G10L 21/0208; G10L 17/00; G10L 17/02; G10L 17/04; G10L 17/06; G10L 15/02; G10L 15/00; G10L 15/10

See application file for complete search history.

(56) References Cited

U.S. PATENT DOCUMENTS

| | | | |
|---|---|---|---|
| 11,437,019 B1* | 9/2022 | Sieracki | .................. G10L 15/02 |
| 2015/0301796 A1* | 10/2015 | Visser | ..................... G10L 17/22 |
| | | | 715/728 |

* cited by examiner

*Primary Examiner* — Vu B Hang
(74) *Attorney, Agent, or Firm* — Rosenberg, Klein & Lee

(57) ABSTRACT

A system and method for authenticating sound verbalized or otherwise generated by a live source within a monitored setting for voice-controlled or sound-controlled automation of a responsive process. One or more classifiers each generate a decision value according to values of predetermined signal features extracted from a received digital stream, and a sound type classification is computed according to an aggregate score of a predetermined number of decision values. The actuation of the responsive process is authenticated when the system discriminately indicates the captured sound signals to be verbalized or generated by a live source. The responsive process is thereby suppressed when the sound is instead determined to be reproduced or otherwise previously transduced, for example by a transmission or recording.

2 Claims, 11 Drawing Sheets

SYSTEM AND METHOD FOR SOURCE AUTHENTICATION IN VOICE-CONTROLLED AUTOMATION

RELATED PATENTS AND APPLICATIONS

This application is based on U.S. Provisional Patent Application No. 62/925,457, filed on Oct. 24, 2019, and patent application Ser. No. 17/080,550, which are incorporated herein by reference.

BACKGROUND OF THE INVENTION

The subject system and method are generally directed to a system and method for source authentication in voice-controlled automation. The system and method generally provide for distinguishing speech or other sounds produced by a "live" source from previously transduced speech or other sounds—for example, a recording or a transmission—such that an automated responsive action to the speech can be triggered or not triggered based in part on the determination.

Various voice-controlled systems, such as "digital assistants," "smart televisions," and "smart houses," have been developed over the years to respond to voice input. A person "asks" for activation of particular functions through vocalized statements. These statements are received by a microphone or microphone array, processed, and parsed for meaning, and then a corresponding function is executed by the system. As a form of general user input, voice control and vocal input can operate in combination with a wide variety of automated systems, offering any number of functions.

When they operate accurately, voice-controlled systems are convenient as they can be activated at range, and configured to use intuitive phrases that even a child can remember and provide. These systems can also be secured by limiting input to particular voice prints such that the functions cannot be activated by an unfamiliar voice.

Voice-controlled systems are also not the only types of systems that respond to sound. In various contexts, it is useful for a system to detect a particular sound and automatically execute a function intended to respond to the likely cause of that sound. Examples of such sounds, without limitation, include non-speech sounds such as footfalls, a person falling, door knocks, gunshots, traffic or machine related noises, animal noises, other natural sounds such as a tree falling, wind or lightning, and so forth. More details of such systems will be discussed in the primary disclosure.

Most improvements in the field of voice-controlled and sound-controlled systems have been directed to increasing the accuracy with which such systems parse the vocal input or the target sound, and the flexibility such systems have in recognizing and adjusting to the natural variations in input, such as vocal cadence and tone. However, other features of such systems are also in need of development.

SUMMARY OF THE INVENTION

It is an object of the disclosed system and method to accurately distinguish previous-transduced sounds from their originally-generated equivalents.

It is another object of the disclosed system and method to authenticate speech as "live" rather than "reproduced," such that an automated voice-controlled system may execute its functions appropriately.

It is yet another object of the disclosed system and method to prevent both inadvertent and malicious operation, by use of sound recordings or sound transmission, of an automated sound-controlled system.

These and other objects may be attained in a system and method for source authentication in voice-controlled automation. In accordance with certain embodiments of the present invention, a system is provided for discriminating sound verbalized by a live source within a monitored setting for authenticating voice controlled automation of a responsive process. The system includes at least one transducer capturing sound signals emitted within the monitored setting to generate transduced signals therefor. The system further includes a capture channel coupled to the transducer. The capture channel forms a digital stream based on the transduced signals. The system further includes a classification processor coupled to the capture channel. The classification processor executes to generate a sound type classification for the digital stream. The classification processor includes at least one feature extractor configured to extract one or more of a plurality of predetermined spectral features of the digital stream. The authentication classification further includes at least one classifier coupled to the feature extractor. The classifier is configured to generate at least one decision value based on the one or more extracted spectral features. The authentication classification further includes a status generator coupled to the classifier. The status generator computes the sound type classification for the digital stream according an aggregate score of one or more decision values generated by the classifier. Captured sound signals verbalized by a live source are discriminately indicated according to the sound type classification to authenticate voice controlled actuation of the responsive process based thereon.

In accordance with certain other embodiments of the present invention, a system is provided for discriminating reproduced speech in a vocal input. The system includes at least one transducer configured to capture vibration signals from a surrounding environment. The system further includes a capture channel coupled to the transducer. The capture channel receives and converts the signals captured by the transducer to form a digital stream. The system further includes a processor configured to generate a speech type parameter value for the digital stream. The processor includes a classifier configured to generate a speech decision value according to values of predetermined signal features of the digital stream. The processor further includes at least one decision buffer having a predetermined decision buffer length. The decision buffer maintains an aggregate score of speech decision values generated by the classifier. The processor further includes a status generator configured to generate the speech type parameter value according to the aggregate score of speech decision values. The speech type parameter value is provided for triggering one or more functions of a response system responsive to a vocal input represented in the digital stream.

Additional aspects, details, and advantages of the disclosed system and method will be set forth, in part, in the description and figures which follow.

DETAILED DESCRIPTION OF THE PREFERRED EMBODIMENTS

Figure 1A:
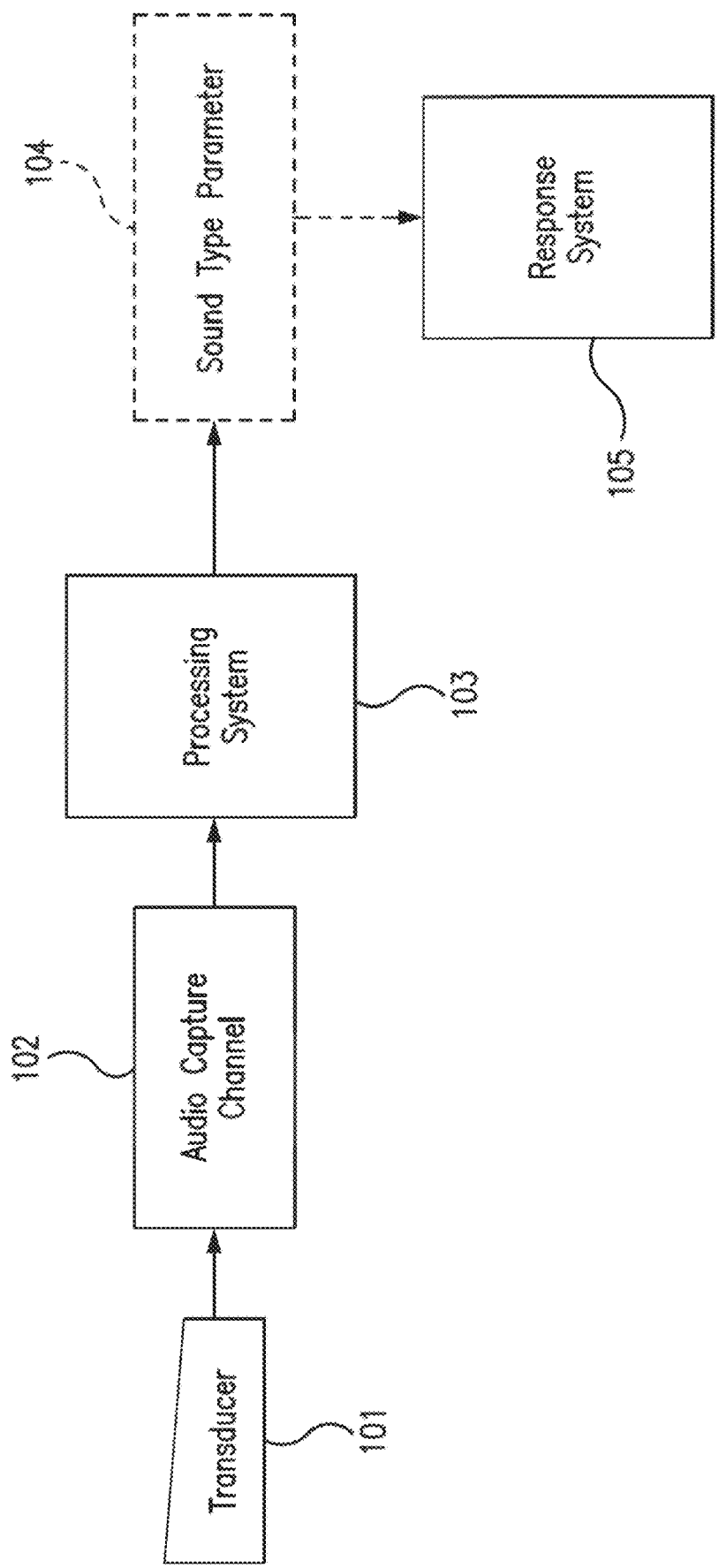
FIG. 1A is a block diagram illustrating a system for source authentication in voice-controlled automation, in accordance with an exemplary embodiment of the present invention.

Reference will now be made in detail to exemplary embodiments, which are illustrated in the accompanying drawings, wherein like reference numerals refer to the like elements throughout. The embodiments are described below in order to explain the disclosed system and method with reference to the figures illustratively shown in the drawings for certain exemplary embodiments for sample applications.

As stated in the Background, it is useful for certain types of systems to activate certain automated functions in response to vocal input. For ease of description, these automated functions will be referred to generally as the "triggered functions" going forward, a spoken phrase which activates a triggered function will be referred to generally as its "vocal trigger," and an existing system which executes one or more triggered functions responsive to their respective vocal triggers will be referred to generally as the "voice-controlled system." It is also noted that the term "speech," as used herein, can include any number of vocal utterances, including meaningless gibberish and noises such as grunts, unless specified otherwise. Likewise, the term "phrase," as used herein, can include any distinct unit of speech, including single words, as well as the other utterances which are speech in this context.

As a simple example, a voice-controlled system may be a security system for a "smart home" or other building. The triggered functions in this example may include the "locked" and "unlocked" states for one or more automated doors in the building, which are triggered responsive to detection of the vocal triggers "lock the doors" and "unlock the doors" respectively. This example is for illustrative purposes, as the subject system and method may be suitably implemented in other types of systems and need not be limited thereto. Indeed, "digital assistants" and "smart homes" are generally configured to execute a wide variety of triggered functions, including but by no means limited to activating or deactivating a variety of security features, turning lights and climate control on and off, playing music and other entertainment, searching for information on the Internet, making purchases, and transcribing and presenting notes and schedules.

Though offering an intuitive and convenient means of input, voice control also introduces certain insecurities, allowing for undesired activation of the triggered functions by malicious actors or even by accident.

For example, because it is desirable that voice-controlled systems be intuitive, the vocal triggers are commonly-known or easily guessed in most systems on the market. However, if a vocal trigger is commonly used outside the context of the voice-controlled system, it may be coincidentally spoken, for example, in an entertainment broadcast or recording, or over speakerphone, triggering functions that are not in fact desired by any user actually present in the environment or setting. Indeed, such reproduced triggers can be used in the same contexts intentionally, either as nuisance pranks or as much more malicious activity depending on the specific triggered function. Examples of this can include nuisances such as turning off the lights for all viewers of a television show, or a hostile individual on speakerphone shouting a vocal trigger such that a smart house unlocks the front door to permit entry.

Many voice-controlled systems use an initialization phrase, also known in the art as a "wake word," of which present examples include "Alexa," "Siri," and "Hey Google." Unless the vocal trigger includes a designated wake word for the system—for example, "Alexa, lock the doors"—the system does not process the vocal trigger and the triggered function does not activate. Other systems make use of unusual vocal triggers which are not spoken in regular conversation. Both approaches greatly reduce the likelihood of accidental activation. However, this will not prevent intentional misuse of a vocal trigger, as a prepared malicious actor is likely to know the exact vocal trigger, including any wake word.

Existing safety measures also include mass communication between voice-controlled systems over large area data sharing. The systems cross-compare their received input over data connections. When a particular vocal trigger is simultaneously received by numerous systems at once, it is assumed that this is the result of a broadcast of some kind, and the corresponding function is suppressed. However, this measure has several limitations. It is limited only to input from mass broadcasts which are being viewed simultaneously, an increasingly rare scenario in the age of entertainment streaming on demand. It also requires a data connection to a network, which may not be desired or feasible in all systems and implementations, as well as a threshold number of other systems on the same network which may be exposed to the same vocal trigger. And the system must cross-compare every vocal input to be effective, causing delays in the execution of triggered functions.

Another safety measure is to limit use of the system to particular authorized voices, using voice print recognition. If the vocal trigger is not spoken by a recognized and authorized voice, the triggered function will not activate. However, this too can be bypassed, by recording an authorized voice speaking the vocal trigger, and then playing it back at a later time. Because at least some vocal triggers are likely to be used daily, or even several times a day, by an authorized user, opportunities to record the trigger for replay are numerous. Live authentication of an authorized user is one important application of the present invention, just as, for example, high security fingerprint scanners must be designed to look for indication that the authorized print is on a live human hand.

It is therefore desirable that a voice-controlled system operating in a monitored environment or setting include means to authenticate a vocal trigger, by determining whether it has been spoken by someone who is actually present in the environment and speaking in the moment. For ease of description, this form of speech will be described as "live speech" or "originally-generated speech" going forward. In contrast, speech which was transduced prior to receipt by the system, and then emitted from an electronic or other artificial speaker, will be described as "reproduced speech" or "previously-transduced speech" going forward. The latter form of speech can include but is not limited to speech that is transmitted from another location and speech that is pre-recorded.

This system should avoid both "false positive" conclusions that reproduced speech is live, which leads to the above-noted issues, and "false negative" conclusions that live speech is reproduced, which leads to valid voice input remaining unprocessed. In certain implementations, this system can further (or alternatively) identify whether the source of the speech is inside or outside the monitored environment.

Briefly, a system and method realized in accordance with certain aspects of the present invention provide for identifying when a vocal trigger contains speech that has been previously transduced or processed, even when the trigger is otherwise identical to speech verbalized by a live source. Using this system and method, voice-controlled systems can be configured to respond only to a live person speaking, and not to recordings, transmissions, or other previously-transduced sounds. As a result, the insecurities in such systems, described above, are closed off, yet the system continues to operate as expected in response to a physically present user. In particular, speech from a person well outside the environment, who should not have access to the system, is ignored even if transmitted into the environment. Also, recorded speech of an authorized user cannot simply be replayed by a malicious actor.

A preferred embodiment of the system makes use of an initialization phrase or "wake word." Along with the aforementioned advantages of signaling to the system that the words immediately following the wake word are intended as vocal input, the wake word is a consistent phrase which is more easily compared to previous live and reproduced use of the same phrase. (It is noted that the term "wake word" is understood in the art to include multi-word phrases, such as "Hey Google.") Other expected phrases may also be processed in the same manner. However, it is also within the scope of the invention to process effectively arbitrary speech, preferably over a longer period of time to confirm the accuracy of a determination.

It is noted before continuing that many of the principles disclosed herein are applicable in contexts other than speech and voice-controlled systems. As noted in the Background, other systems exist in the art which react to particular sounds emitted by any number of sources, living or otherwise. A few examples, which are by no means exclusive, include: the detection of various human-generated noises (including non-speech sounds such as footfalls) to infer the presence of a person in a building and activate lighting or environment control, the detection of a person falling or of gunshots to transmit an Enhanced 911 communication, the detection of traffic or construction noises to assist in calculating the fastest route to a destination, the detection of wild animal noises to provide scientists with information on their presence and current behavior, the detection of a tree falling in combination with storm noises to triangulate the position and signal for clearance crews, and the detection of door knocks to inform a deaf inhabitant of a house by visual means that someone is on the porch. Each such system, and others, can be fooled by previously-transduced sounds such as recordings or transmissions, and would be improved by the principles disclosed herein, suitably implemented for the desired application in a manner which will be clear to those of skill in the art.

Furthermore, the fact that a sound is reproduced can be the primary important aspect of the sound. For example, when transmitting or recording sound, it may be desirable for only actual speakers to be included in the final result. If it is determined that some speech currently in an environment is reproduced, perhaps because it is part of an entertainment program playing in the background, that recorded speech can be filtered out by known means, such that it does not interfere with the audibility of the intended speaker.

Nonetheless, for reasons of brevity and convenience of description, the context of voice-controlled automation will be assumed going forward.

FIG. 1A depicts a system for source authentication in voice-controlled automation, according to an exemplary embodiment of the invention.

In the depicted embodiment, a physical sounds transducer 101, such as a microphone, contact microphone, accelerometer, piezo device, or any other means to capture vibration or sound energy from the room, provides input. Without loss of generality, herein the word "microphone" will be used to describe any suitable transducer, and the word "sound" to describe any set of vibrations detected as a signal, regardless of the frequency ranges involved and the nature of the transducer.

In some embodiments, more than one transducer may be connected as input. For example, in the variant embodiment depicted in FIG. 1B, a plurality of microphones 101a, 101b, 101c are connected in an array 101'. These may be configured to selectively be used, to be tested sequentially by the system, to be tested individually by the system with results of determinations (later discussed) combined, or used jointly in beam forming to find each source sound and produce a final signal channel with directional information, among others. In that last configuration, it becomes possible to use the directional information to further guide decisions about whether the sounds being detected are live speech or reproduced speech.

In the basic configuration discussed, without loss of generality, it can be assumed the microphone sound data is reduced to a single channel for further processing in this example. The microphone 101 is therefore coupled to an audio capture channel 102, which in accordance with the type of input transducer, performs amplification, conditioning, and sampling or resampling of the sound input to produce a digital stream of audio data, which are individually known in the art and will not be detailed herein. Typically, this stream is produced at a fixed sample rate. 16 Khz (16,000 samples per second) is an example of an audio rate conducive to the present invention's function, but higher or lower sample rates can be used without significant change to the functions described herein and are within the scope of the invention.

Sound signal data is passed from the capture channel 102 into the processing system 103. Suitable processing systems include but are not limited to an embedded MPU, a microprocessor CPU, or other computing devices capable of being enabled to perform the operations described herein as software functions. This processing system 103 generates an output 104, which in the embodiment depicted in FIG. 1A is simply a parameter value indicating a sound type classification, namely, whether the received sound is live or reproduced. This parameter value is termed a "sound type parameter value" hereinafter, for convenience. In some embodiments, such as the one depicted in FIG. 1B, the same processing system outputs both a sound type parameter value 104*a* and an initialization detection parameter value 104*b*, the latter indicating whether the received sound is the initialization phrase.

The generated output 104 is in certain embodiments simply a parameter value or set of values provided to a user or a record stored to a log. However, preferably, the output 104 is further acted upon by the activation of triggered functions responsive to the output 104. This further processing, in certain embodiments, is conducted on the same processing unit 103 in additional software functions, while in other embodiments it is instantiated in a separate response system 105 that receives the output. In embodiments where the output 104 includes both a sound type parameter value 104*a* and an initialization detection parameter value 104*b*, whether or not the triggered functions activate is dependent on both values.

Figure 1B:
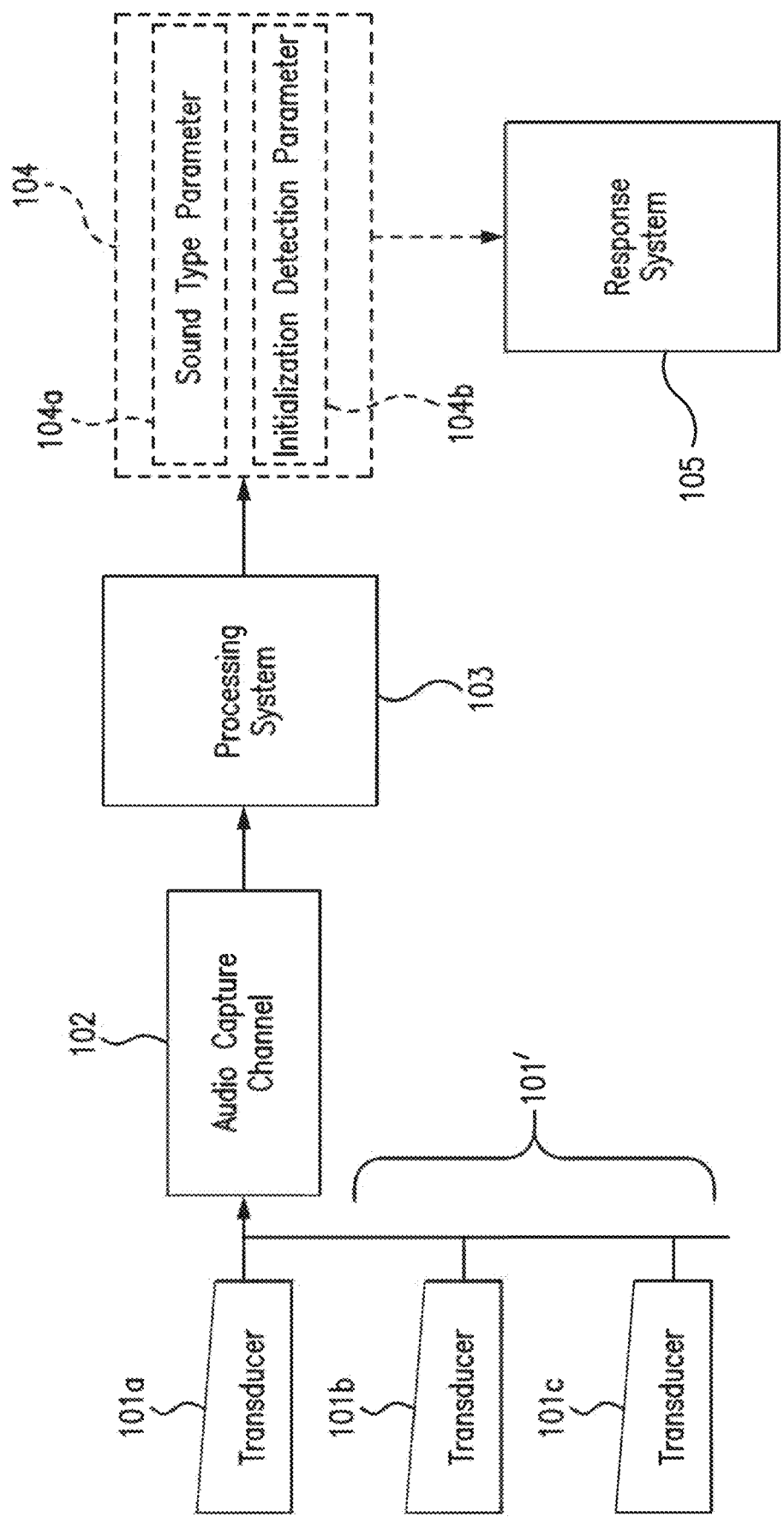
FIG. 1B is a block diagram illustrating another system for source authentication in voice-controlled automation, in accordance with another exemplary embodiment of the present invention.
Figure 1C:
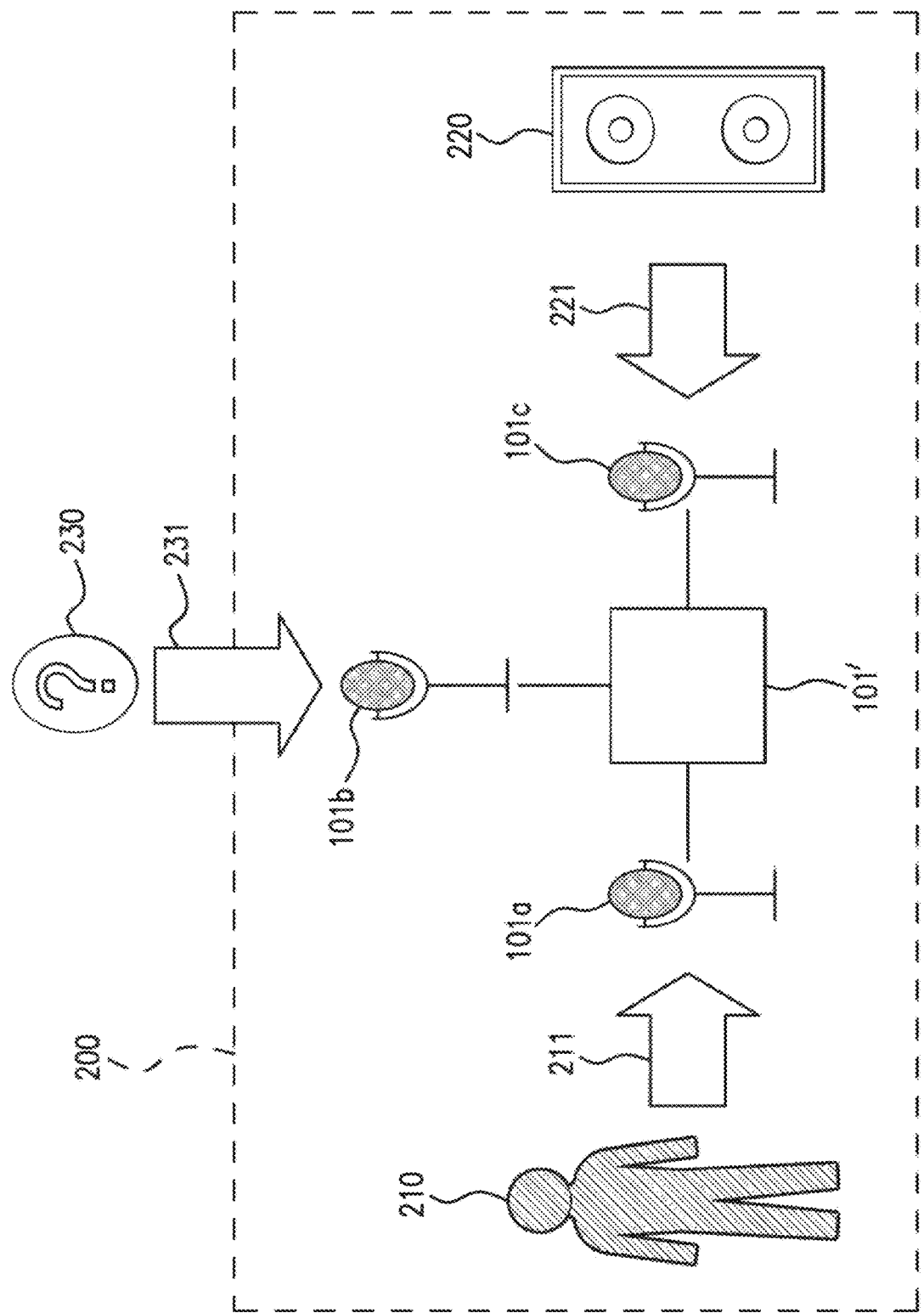
FIG. 1C is a block diagram illustrating disposition of components of a system for source authentication in voice-controlled automation, relative to a monitored environment, in accordance with an exemplary embodiment of the present invention.

FIG. 1C further depicts disposition of aspects of the embodiment depicted in FIG. 1B. As illustrated, the microphone array 101' includes a plurality of microphones 101*a*, 101*b*, 101*c*. This array 101' will typically be placed in a defined environment 200, such as a room, a hall, a vehicle, a local region of an outdoor space, etc., which the system is tasked to monitor. The monitored environment 200 is expected to episodically contain speaking humans 210, which the system is tasked to detect the speech 211 of, and to differentiate this live speech 211 from any non-live, previously transduced sounds 221 that may issue from sound reproduction systems such as an acoustic loudspeaker system 230. The microphones 101*a*, 101*b*, 101*c* of the microphone array 101' are typically arranged in a single fixture, such as a voice assistant or monitoring box, but may in some embodiments be spaced on multiple fixtures about the environment. Again, the depicted array of three microphones 101' is exemplary, and a single microphone or an array of any other number may be equivalently used. It should be further noted that, although FIG. 1C illustrates each sound coming into a different mic, that is purely for clarity of exposition. In general practice, each and every sound will be simultaneously received by several or all microphones in the array. While the directionality of sound may be considered as a factor in making the target sound type distinction, the preferred embodiment will make determinations based on features further described below that are not specific to the receiving microphone.

It is preferred that the system be "tuned" to the monitored environment 200 in which it is disposed. For example, in the monitored environment 200 depicted in FIG. 1C, the system accounts for the specific relative placement and output characteristics (such as spectral shape and dynamics) of the loudspeaker system 230, such that sounds from that direction and with those output characteristics are more likely to be classified as "reproduced." In environments where a live sound source is also likely to have a particular placement, such as an average human height above the driver seat in a car cabin, similar adjustments enable the system to more likely classify sound from that position as "live." The system can also be trained to account for are the overall acoustics of the environment 200, such as how sound is likely to reflect off the surfaces within and how this will affect the characteristics of the sound. In different embodiments and implementations, this can be by the way of manual configuration, or by "training" (such as through machine learning) within the monitored environment. In certain embodiments, existing training in a general environment is first provided prior to deploying the system, and then additional training specific to the monitored environment is provided after deployment.

Certain embodiments of this system are also configured to differentiate sounds 211, 221 emanating from inside the monitored environment 200 from those sounds 231 emanating from a source 230, whether live or reproduced, outside the monitored environment 200. Such embodiments can use this feature to detect the presence of users or human beings in the environment, for security or smart home applications. Such embodiments can also operate for a localized monitored environment 200 in a much larger space, such as a house with multiple voice-controlled assistants in which it is desirable that only the nearest unit respond to a user rather than multiple units. As will be described further herein, this can be implemented in certain embodiments by including both "in environment" and "out of environment" speech in the training sets for the system.

Figure 1D:
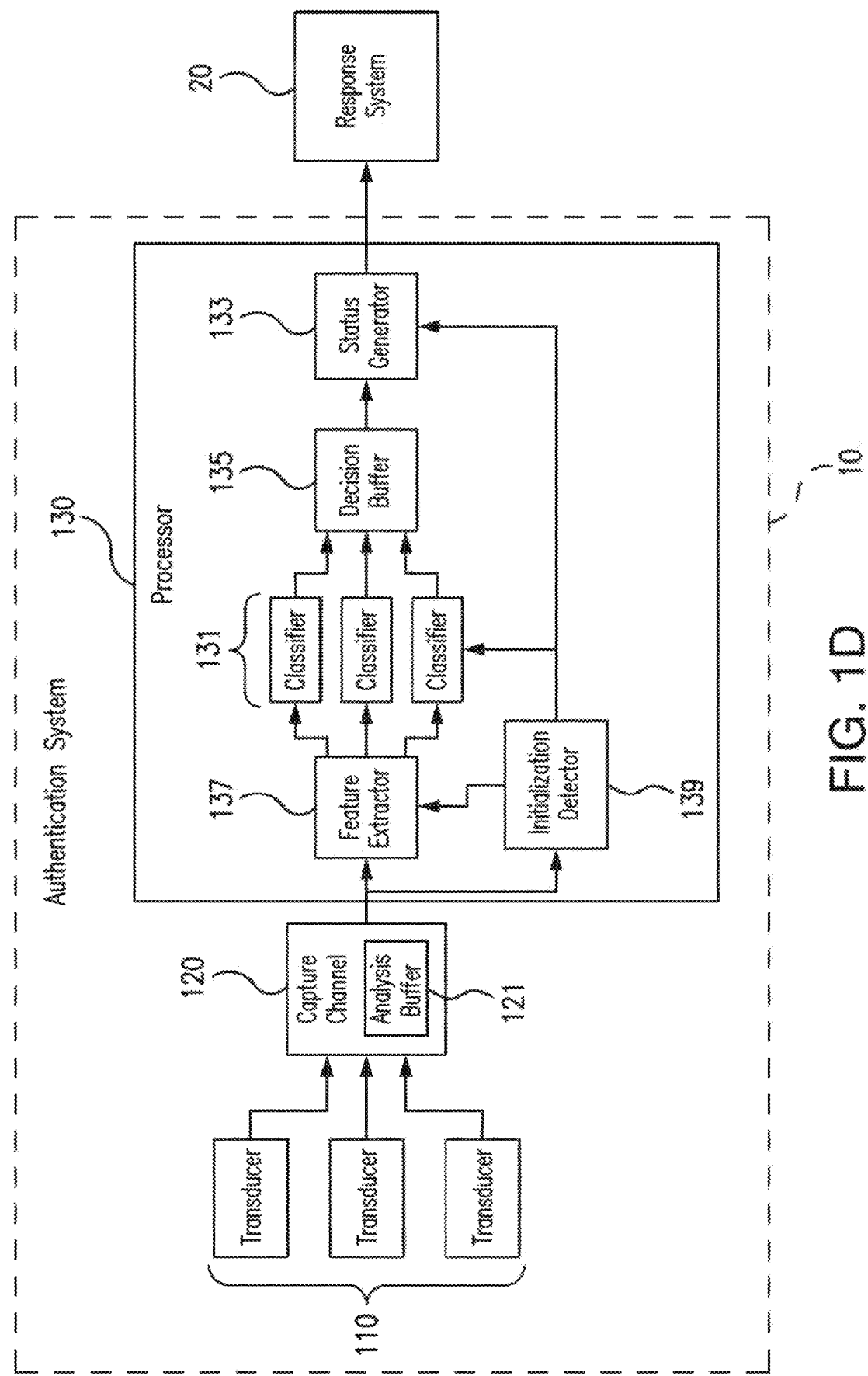
FIG. 1D is a block diagram illustrating another system for source authentication in voice-controlled automation, in accordance with yet another exemplary embodiment of the present invention.

FIG. 1D depicts another authentication system 10 for source authentication in voice-controlled automation, according to another exemplary embodiment of the invention. In the depicted embodiment, at least one transducer 110 is coupled to an authentication processor 130 through an audio capture channel 120. The authentication system 10 is coupled to a response system 20.

In the illustrated embodiment, a plurality of transducers 110 are provided, although this is not a limitation. The transducers 110 are configured to capture sound and/or vibration signals, such as acoustic waves. Preferably, the transducers 110 are formed by one or more suitable devices known in the art capable of capturing vibration energy, including but not limited to traditional and digital microphones, accelerometers, piezo devices, sonar receivers, and vibrational sensors. In some embodiments, the transducer or transducers also capture the direction of the energy. The transducers 110 are disposed in a surrounding environment, which is expected to episodically but not constantly contain users, such that the authentication system 10 as a whole can monitor the environment and determine when those users (and not a sound reproduction device) are speaking. The monitored environment can be but is not limited to a room or set of rooms (including hallways), an entire building, a vehicle, or a local region of a defined outdoor space. A suitable number and distribution of transducers 110 are disposed based on the size of the monitored environment, the presence of any obstacles which might impede the flow of sound energy, and other factors.

The capture channel 120 is coupled to the transducer (or transducers) 110, and is configured to convert the captured signals received therefrom into a digital data stream. In certain embodiments, such as the depicted embodiment, a single capture channel 120 is used regardless of the number of transducers 110, and the signals captured by the transducers are combined in the capture channel 120.

However, in other embodiments, a plurality of channels are provided, each converting the signals captured from a respective one or a respective subset of the transducers 110. Such separation is useful for certain forms of later analysis, as will be discussed further herein.

The capture channel 120 preferably performs a suitable combination of amplification, conditioning, sampling, and resampling as part of the conversion to digital format, which are individually known in the art and will not be detailed herein. Typically, this digital stream is produced at a fixed sample rate. 16 Khz (16,000 samples per second) is an example of an audio rate conducive to the present invention's function, but higher or lower sample rates can be used without significant change to the functions described herein and are within the scope of the invention. Additionally, certain embodiments may employ variable sample rates, for example in accordance with changing environmental requirements, or in accordance with certain parametric features of some microphone transducers (e.g. pulse-width modulation coding).

The capture channel 120 preferably maintains an analysis buffer 121 for isolation of a most recent segment of the digital stream, which will be the focus of analysis. The operation of this buffer 121 will be described further herein.

A plurality of processing modules execute on the authentication processor 130 to process the digital stream generated by the capture channel 120, or more preferably to process the segment of the stream currently in the analysis buffer 121. These modules include at least one classifier or decision engine 131 and a status generator 133.

Each classifier 131 is configured to generate decision values based on analysis of the recent signal data in the digital stream or the analysis buffer 121. Preferably, each generated decision value includes an indicator or probability value indicating whether the source of the signal data is likelier to be "live speech" or "reproduced speech."

In some embodiments, such as in the depicted embodiment, a plurality of classifiers 131 are implemented, and each classifier 131 is configured to classify the signal data based on different aspects of the signal features. Additionally, some classifiers might determine the likelihood that the signal data indicates "live speech" (as opposed to all other sounds, speech or otherwise) and others might determine the likelihood that the signal data indicates "reproduced speech" (as opposed to all other sounds, speech or otherwise). Furthermore, classifiers may be "chained together" such that some analyze data only upon certain determinations by others.

The means by which a classifier makes its determinations is not limited, as many suitable means for automatic categorization of vibrational and acoustic signals are known in the art. Indeed, in certain embodiments, not all of the classifiers 131 use the same means. However, in a preferred embodiment, the classifiers 131 consider the value of one or more signal features in the analysis buffer 121, which represents the signals captured within a predetermined length of time. Certain signal feature values, or combinations thereof, within the analysis buffer 121 indicate to the classifiers 131 that either live or reproduced speech has occurred. These features can include, but are not limited to root mean square (RMS) energy, crest factor, spectral shape, spectrogram and similar short window time analysis of spectral shape spaced overtime, the periodicity of such spectrograms, filter banks, or sparse signal decompositions. Features can also include the direction of arrival of the sound computed from the array of transducers, or the most proximal transducer, as discussed previously. Without limitation, spectral shape may be measured for example in some embodiments by a discrete Fourier transform, the log or power of such, or the same normalized by RMS energy of the window. It is noted that the window in this context need not be the entire content of the analysis buffer 121; in certain embodiments the feature is determined for a plurality of windows, either discrete or overlapping, within the buffer.

The features and their values, in the form of feature spaces or otherwise, can be mapped into classifications by the classifiers 131 using suitable techniques known in the art, including but not limited to support vector machines, logistics regression, random forests, neural networks, deep neural networks, binary neural networks, and even manual configuration of value ranges or thresholds for comparison tests. In a preferred embodiment, the sounds are classified according to type using, for example, acoustic signal discrimination measures disclosed in U.S. Pat. Nos. 7,079,986 and 8,271,200. Additional operations of these classifiers will be described further herein, particularly with reference to FIG. 2A.

In certain embodiments, a separate feature extractor 137, also executing on the processor 130, measures the values of these features from the stream segment. Preferably, the feature extractor 137 generates a feature vector which includes these signal feature values, which is then analyzed by the classifiers 131. This approach is more efficient when a large number of classifiers 131, all using overlapping information for classification, are included. The feature extractor 137 preferably does not consider the entire digital stream, but merely the contents of the analysis buffer 121, which contains the most recent portion of the stream. In certain embodiments, the feature extractor 137 and not the capture channel 120 isolates and maintains this analysis buffer 121.

Operations of the feature extractor 137 will be described further herein, particularly with reference to FIG. 3.

The status generator 133 generates a value for a sound type parameter. This value is an indicator of whether the presently-analyzed contents of the input stream are more likely to reflect live speech or reproduced speech.

In certain embodiments, the status generator 133 generates the sound type parameter value based solely on the most recent contents of the analysis buffer 121 or other analyzed segment of the digital stream, through a score based solely on the decision values generated from analysis of these contents That is, the sound type parameter value reflects only the most immediate sound analysis.

However, in some embodiments, a decision buffer 135 maintains an aggregate score or sum of instant joint decision values. The decision buffer 135 has a predetermined maximum number of instant joint decision values, which can be termed the decision buffer length. Each instant joint decision value reflects all individual decision values respectively produced by the classifiers for a given segment of the digital input stream. In such embodiments, the status generator 133 generates the sound type parameter value based on the instant joint decision values in the decision buffer 135, and indirectly based on the individual decision values generated for multiple analyzed segments of the digital stream over a series of analysis by the classifier or classifiers 131.

Additional operations of the status generator 133 and decision buffer 135 will be described further herein, particularly with reference to FIGS. 2A and 2B.

In some embodiments, an initialization detector 139 separately analyses the content of the digital stream in the capture channel 102, or the segment in the analysis buffer 121, to identify a spoken initialization phrase. When the initialization phrase is identified, in one embodiment, the initialization detector 139 preferably signals at least one of the feature extractor 139, classifiers 131, or status generator 133, which do not operate until receiving this signal. Therefore, identification of the initialization phrase is necessary to the generation of the sound type parameter value in such embodiments. In such embodiments, this sound type parameter value reflects the analysis of the signal features produced by the spoken initialization phrase, providing a more consistent analysis baseline. Such embodiments can be described as including two general operations of (1) detecting a candidate initialization phrase and (2) determining if that particular instance is "live" or pre-transduced, though these operations need not be strictly sequential. Additional operations of the initialization detector 139 will be described further herein, particularly with reference to FIG. 2A

Applications of the authentication system 10 through coupling to a response system 20 have been previously discussed generally in the Background. In summary, it is advantageous for a variety of voice-controlled devices and other types of response systems to be provided with accurate information about whether vocal input is being presently generated by a source in a monitored environment, and was not previously transduced by another system (for instance, transmitted or recorded), such that their triggered functions may be executed (or not executed) in accordance with this information.

The response system 20 and its triggered functions potentially include any functions a computerized system can offer. These include, but are not limited to: lighting, environmental controls, locks and automated doors, alarms, security monitoring, entertainment presentation, data entry and lookup, smart car operation, and smart appliance operation.

Coupling the authentication system 10 with any of these response systems 20 is within the ability of those skilled in the art based on the above disclosure, and will improve the performance of the response system 20 accordingly.

Indeed, various such response systems may be implemented by inexpensively retrofitting existing systems already including some of the preferred components, such as a microphone or other acoustic sensor, one or more processors, and data storage. Certain embodiments of the authentication system 10 are therefore implemented in this manner, incorporating additional software instructions encoded within the corresponding response system 20 and executed on an existing processor of the response system 20.

As another possible implementation, the authentication system 10 takes the form of an independent acoustic sensor or networked series of sensors, with a processing unit either built into one of the sensors or networked thereto. The authentication system 10 is coupled or networked for communication with the response system 20, and communicates the sound type parameter value through transmitted signals to the response system 20. The intercoupling and networking between components can take various suitable forms known in the art, including but not limited to physical cables, WLAN ("WiFi"), Bluetooth, infrared, RF, cellular networks, or a combination thereof. It is noted that two-way communication between the authentication system 10 and response system 20 is not required, although it is preferred to include a channel from the response system 20 to the authentication system 10 for confirmation that the signals are being received and understood.

It is further noted that it is within the scope of the invention that a response system 20 be omitted entirely. Instead, in certain embodiments, the authentication system 10 simply outputs the sound type parameter value by any suitable alert or output measures, such as an audio speaker, log file, printout, or display. In certain embodiments, either in combination with the output or separately, the authentication system 10 records the value to a log of suitable form, to be referred to as needed.

Figure 2A:
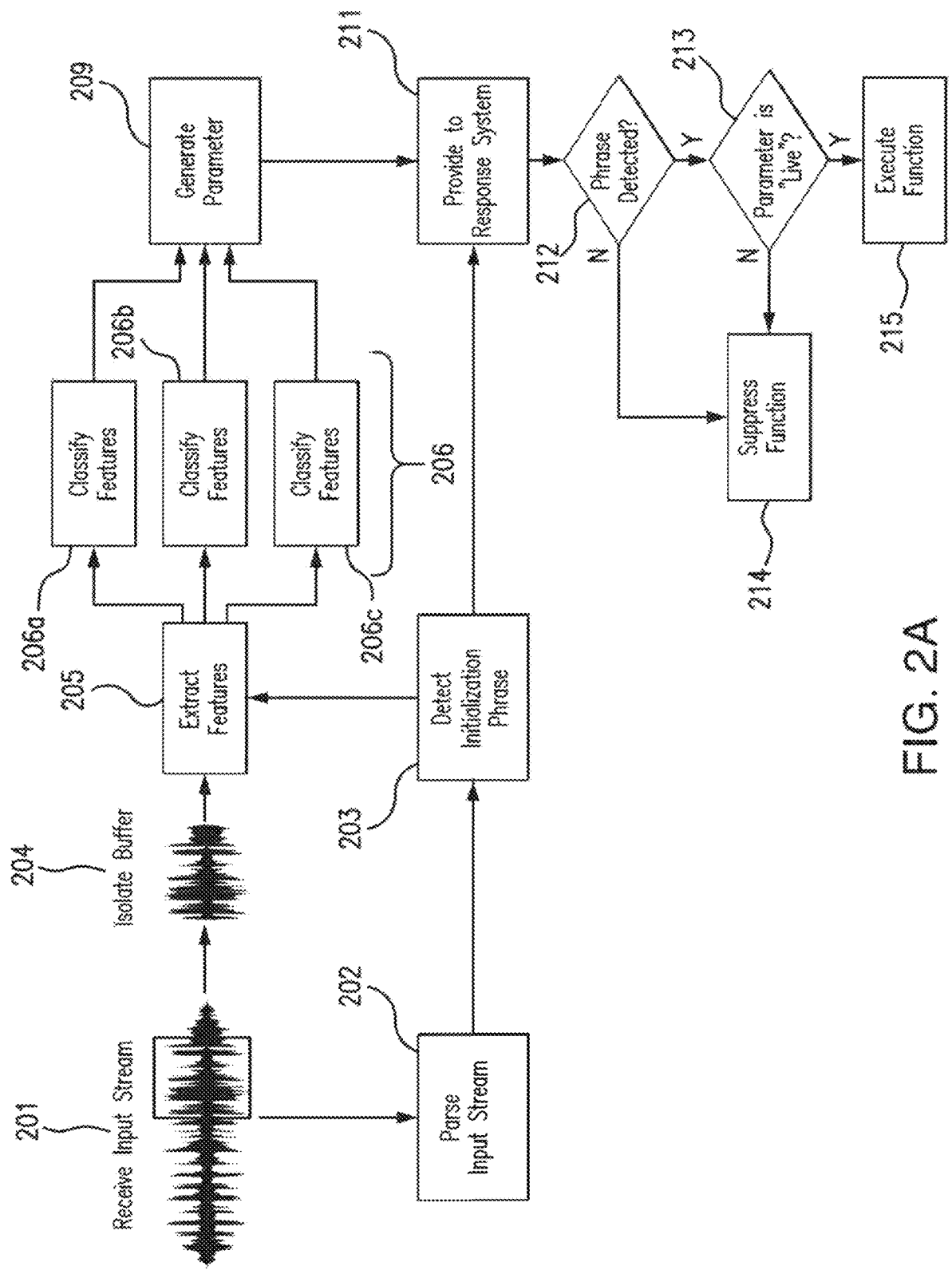
FIG. 2A is a flow diagram illustrating a flow of processes for source authentication in voice-controlled automation, in accordance with an exemplary embodiment of the present invention.

FIG. 2A depicts a certain flow of operations to carry out a method for source authentication in voice-controlled automation, according to an exemplary embodiment of the invention.

In the depicted embodiment, a continuous stream of sound input is received from the physical world at operation 201, through transducers or other audio input such as described in relation to FIGS. 1A-1D. Recent sound is isolated in an analysis buffer, such as the analysis buffer 121 in the embodiment of FIG. 1D, for analysis at operation 204. As is well understood in the art, the buffer can be configured as a circular or shifting buffer or similar, where older data is discarded while newer data is added. As an example, the time period spanned by the buffer in some embodiments covers about one second of time, which is appropriate for clear analysis of many human generated sound types. Shorter or longer periods may be worked with, with only minor changes to the implementation, with functionality in some embodiments preferentially using as little as ⅛ second windows and as long as ten second windows. In general, the nature of the target speech phrase or other sound will define the duration, and thus inform the length of time that must be buffered so that they may be analyzed. As discussed below, this buffer may also be shortened in favor of buffering progressive analysis (feature extractions) in its place. If shorter sounds are mixed with longer sounds in the detection schema, then in certain embodiments the feature extraction for the shorter sounds employs sub-windowing of the longer buffer.

Signal features are extracted from the buffer content by the processor at operation 205, in order to produce a set of numerical measurements that contain discriminatory information about the signal in the buffer. Certain embodiments will include a means to extract specific features, including, but not limited to, some or all of: RMS energy, crest factor, spectral shape, spectrogram and similar short window time analysis of spectral shape spaced in time, the periodicity of the spectrogram frequency bins. In certain example embodiments, spectral shape is measured by a discrete Fourier transform (such as an FFT or other means to fit component signal energy), the log or power of such, or the same normalized by RMS energy of the window. In certain embodiments, the extraction processes also include filter banks, or sparse signal decompositions as known in the art. The extraction of certain preferred features will be discussed further herein, particularly with respect to FIG. 3.

In configurations where the extracted feature data includes spectrogram type information, which are accumulated from smaller windows spaced over time, in certain embodiments the features are computed progressively and buffered. For example, in certain embodiments a spectrogram is computed by operating on only a short period of sound with an FFT, and storing the FFT output for that time slice, thus enabling more efficient processing in terms of cycle count than repeating the analysis on each shifted window in full. Such an embodiment also allows a shorter sound buffer at operation 204 to accommodate only the data needed for the progressive transforms, thus saving memory.

Other embedded signal processing tradeoffs may be applied, which are known in the art, to make the use of memory and processing time efficient for the task.

Prior to operation 205, in some embodiments, either the buffer or the input stream is analyzed at operation 202 to parse the signal for an initialization phrase, or wake word. Suitable processes for parsing an audio input stream for spoken phrases are known in the art, and will not be detailed herein. In a preferred embodiment, the extraction at operation 205 actuates only when this phrase is detected at operation 203. As such, a user speaking the initialization phrase triggers the analysis and determinations that follow. If the phrase's detection is promptly signaled, the content of the buffer still contains the initialization phrase or a portion thereof. In such an embodiment, the buffer period is preferably selected specifically to conform to the expected length of the initialization phrase as spoken, adjusted for the time required to detect the phrase in operation 202. Therefore, because operation 205 and the operations that follow always operate on the same spoken phrase, the resulting analysis is more consistent in its results. However, it is well within the scope of the invention that operations 202 and 203 be omitted, such that the feature extraction at operation 205 operates regardless of any phrases in the input stream.

The initialization phrase detected in operations 202 and 203 need not be the same initialization phrase or wake word used by the response system, although this is convenient in many contexts. In certain embodiments, the initialization phrase is instead, for example, a "request" to be identified as a live person, or as a specific person authorized to use the triggered functions, or some other expected block of audio input. In such implementations, it is convenient, although not required, that a single sound type parameter value of "live speech" will maintain the response system in an active state for a considerable period, much like entering a password in a more convenience computer system.

Furthermore, the "initialization phrase" in some embodiments is not actually a distinct phrase, but any speech (or other specified type of audio) at all. That is, operations 202 and 203 simply confirm that human speech is occurring before proceeding to the remaining operations. Such embodiments can operate with response systems that have no official "wake word," yet prevent needless analysis of random non-speech sounds which will not provide an accurate or useful determination. Still other embodiments for applications other than speech, addressed earlier, focus on authentication of non-speech sounds. It will be clear that detection of a candidate speech phrase at operation 203 may be readily replaced by detection of another candidate sound type, for similar authentication of its "live" or "reproduced" nature in accordance with feature extraction 205 and the following operations.

Having extracted features at operation 205 to produce numerical values, preferably in the form of feature vectors or feature spaces, the values are analyzed and classified in one or more classification or decision operations 206. Each classification operation 206 processes a subset of the feature values, which can be but is not necessarily all values of the extracted features. Each classification operation produces at least one decision value which reflects whether the processed feature values are more likely to indicate live speech or reproduced speech according to the respective operations. In various embodiments, the decision value takes the form of a simple binary value ("live" or "reproduced"), or a probability value indicating which option is more likely. In embodiments which also determine whether the speech is from inside or outside an environment, the decision value also (or alternatively) reflects whether the extracted values are more likely to indicate the source of the speech is inside or outside the defined environment.

A simple example embodiment of a classification operation 206 is a comparison test. For example, in one such embodiment, the magnitudes of a series of frequency bands, which have been preferably formatted into a feature vector or magnitude vector, are compared to a predetermined value or range known to be reliable for human voices. There can be several such ranges, for example, one range for male voices, one range for female voices, one range for child voices, and so on, any of which will produce a decision value. However, other embodiments are within the scope of the invention, and are disclosed elsewhere within.

The means by which these and other ranges and values are determined will be understood by those in the art to include a range of possibilities, including but not limited to hand-selecting thresholds, iterative adjustments, and more complex machine learning operations. When the determination is the result of training, the training sets for the machine learning preferable contain both live speech inputs and reproductions of the same inputs.

Preferably, the buffer contents are analyzed by a plurality of classification operations 206a, b, c, etc., each producing at least one decision value. An overall sound type parameter value or overall sound type classification is then generated at operation 209 based on at least a subset of the decision values, and a "score" value produced therefrom. In a simple example embodiment, this score is simply a sum of all the decision values, and the sound type classification reflects whether the score exceeds a predefined minimum threshold value. In some embodiments, this operation subtracts values that reflect a "likely reproduced" decision and adds values that reflect a "likely live" decision, or vice versa, such that a resulting score reflects a "vote" of the classification operation results.

Additionally, depending on the accuracies of the various classification operations, certain decision values are weighted higher or lower in certain embodiments, such that they have a greater or lesser effect on the sum and whether it exceeds the threshold. It is noted that these weights, if implemented, need not exactly be the values they reflect. As one example, if a first classifier is 40% accurate and a second classifier is 80% accurate, the system as a whole need not apply a 0.4 weight to the output of the first and a 0.8 weight to the output of the second, or even twice the weight to the second as to the first, but merely applies a greater weight to the second than to the first, all other considerations being equal.

The sound type parameter value can then be provided to a response system at operation 211. The response system determines whether to actuate its functions at least in part based on the parameter value.

In a simple example, if at operation 213 the parameter value indicates that the speech is live, the response system executes the appropriate triggered function at 215, but if the parameter value indicates that the speech is not live but reproduced, the response system does not actuate any functions regardless of any vocal input, but suppresses these functions at 214. However, in other embodiments, the triggered functions can be divided between functions which actuate only for live speech, and functions which actuate for both live and reproduced speech, according to the needs of the particularly intended embodiment and application. Other embodiments and configurations of the response system, and when and how it changes its behavior responsive to the sound type parameter value, can also be imagined by those of skill in the art, and are all within the scope of the invention.

In some embodiments which identify an initialization phrase, if this initialization phrase is relevant to the response system's functions, the fact that it was detected can also be provided at operation 211. In such embodiments, preferably, at operation 212, it is checked whether the phrase was detected, and if so, the parameter value check at operation 213 proceeds. If not, preferably, the functions are suppressed at operation 214. Plainly, operations 212 and 213 can be reversed in certain embodiments, depending for example on which check is more likely to be "false" or requires more processing to verify, and can be effectively simultaneous in still other embodiments.

In certain embodiments, the parameter value, the detection of the initialization phrase, or both are indicated by visual or other means. In a simple example, each is represented by a light which turns green or red to indicate the value, such that the triggered functions are suppressed at operation 214 if either light is red. A user can observe these lights to determine why the triggered function was not executed. These indicators can be operated by either the authentication system or the response system.

Other suitable information can also be provided to the response system at 211, including but not limited to the content of the input stream or the buffer, which can be independently parsed by the response system for vocal triggers and details thereof.

As previously noted, multiple capture channels are maintained in certain embodiments of the system. This may be the result of a "stereo sound" arrangement of microphones, or other arrangements of microphones for purposes of directionality or position data. In at least some of these embodiments, as depicted in FIG. 2B, this produces separate input streams, such as at operations 201a and 201b, which respectively generate separate buffers, such as at operations 204a and 204b. Separate feature values are extracted from each buffer at operation 205. Considering the features of multiple streams in the classification operations 206, either in combination or separately, has certain advantages. As one example, the angle of a microphone to the sound source can affect its frequency. More generally, the processing of signals from a microphone array down to a single beamformed channel will have certain effects that will lessen the distinctions between reproduced speech, which is heavily processed, and live speech, which is minimally processed. As discussed previously, an array of microphones may also be used jointly to extract the angle or arrival of the initiation phrase or other sound, which may be employed as a feature in one or more classification operations 206.

Though it is within the scope of the invention to separately analyze each input stream or buffer in operation 202 to identify the initialization phrase, this is in most embodiments and implementations not necessary, as the contents of each are expected to be relatively similar for the purposes of speech parsing. Rather, a single input stream or buffer is arbitrarily selected or a beam-formed mixture is used for such analysis, as depicted in FIG. 2B. For the classification operations 206, it is in certain embodiments preferable to consider each input stream independently before combining the classification results, as some preferred features for making sound type determinations are sensitive to the direction of the sound, reflections in the room, etc., and may be lost by processing into a combined channel.

In the embodiment depicted in FIG. 2A, the decisions of the classification operations 206 are combined in the sound type parameter value generation at operation 209 for an instant and "memoryless" overall decision. However, in the alternative embodiment in FIG. 2B includes additional interim operations before the generation of the sound type parameter value generation. Namely, the decision values are combined into an instant joint decision value at operation 207. This joint decision value can be generated in the same manner as the sound type parameter value generated in operation 209 of the embodiment of FIG. 2A, although this is not a requirement. Each such joint decision value can take the form of a binary decision value, a percentage probability value, or an output score of decision schema. At operation 208, a decision buffer is shifted and the instant joint decision value is added to the decision buffer, while the oldest joint decision value in the buffer is discarded. Then, at operation 209', the sound type parameter value is generated based on the sum of instant joint decision values $D(1) \ldots D(n)$ in the buffer, or by another score reflecting these instant joint decision values.

The decision buffer has a predetermined maximum number of instant joint decision values, which can be termed the decision buffer length. As a result, the sound type parameter value reflects a series of decisions, and represents a "time-smoothed" or average determination of whether speech is live or reproduced. By "smoothing" the decision values in this manner, unexpectedly clear or distorted moments are averaged out, resulting in less false positives and less false negatives.

When the joint decision values are scores, an even more nuanced average determination is achieved.

Preferably, sound type parameter values are generated such that each instant joint decision value is considered multiple times before it is discarded from the decision buffer. For example, in certain embodiments, a sound type parameter value is generated with the addition of each instant joint decision value to the decision buffer, or each time a predetermined fraction of the buffer is discarded. A suitable decision buffer length will vary in part based on whether the classification 206 is continuous, or dependent on the initialization phrase detection 202. In embodiments with continuous and regular classification, the decision buffer length reflects a particular length of time. As such, in an example embodiment with continuous classification, decision values and sound type parameter values are both generated each quarter second, and the decision buffer length is equivalent to ten seconds. This embodiment makes a series of fast assessments, but any given final output is based on consideration of ten seconds of history. In contrast, in embodiments with initialization phrase detection, the decision period does not reflect a specific time period, but a specific number of past initialization phrase detections which occurred over an indeterminate time period. As it is more likely that an initialization phrase is live if other fairly recent initialization phrase were live, in an example embodiment with initialization phrase detection, the decision buffer contains only four instant joint decision values, and a new sound type parameter value is generated after each new instant joint decision value is added to the buffer.

As another, undepicted embodiment, decision values are generated and added to the decision buffer continuously, but a new sound type parameter value is generated only upon initialization phrase detection in operation 202. This factors the initialization phrase detections together with recent history of, for example, how much reproduced speech might have recently occurred while listening to a TV program. This approach allows the system to compare two particular circumstances: one with a recent history of ongoing live human conversation on an initialization phrase is detected, the other with a recent history of ongoing reproduced human speech (such as the TV program) where an initialization phrase is detected.

Although individual classification operations 206 are simple to depict and comprehend, a more unified generation of instant decision values, in the form of a decision schema, is within the scope of the invention. It is understood in the art that many hand-tuned or automatically-tuned algorithms may be substituted and applied to make decisions about features and their significance. Therefore, FIG. 2C depicts another variation on the embodiment of FIG. 2B, wherein a single machine learning-based operation serves as a decision schema, replacing the individual classifiers and generating an instant decision value at operation 207' as the result of a prediction based on previous training.

Machine learning methods are well understood in the art to include algorithms which, in a prediction mode, take a collection of numeric feature inputs and produce a decision as to the class represented by that data. Examples of machine learning mechanisms include but are not limited to support vector machines, neural networks, random forest, boosted decision trees, logistic regression, and binary neural networks, all of which are known in the art in and of themselves. These algorithms are first trained in a learning mode before being deployed in a prediction mode. Some of these algorithms are understood to be able to update themselves in live settings, which is preferable in certain embodiments but not required.

One example embodiment is to use a support vector machine (SVM), which is configured to generate decision values from the computed features. Typically, such an embodiment includes at least one SVM "learner" component model for each class, which operates to compare the features and determine if it is more like reproduced speech or more like live speech. They may also be configured to determine if the signal features are more like a "target" sound, which can be either reproduced speech or live speech, than any other form of sound, including sounds that are not speech at all. As is known in the art, multiple SVMs can be combined (e.g. by an error correcting code method) to produce an instant decision value at operation 207.

To produce these machine learning detectors, it is well understood in the art, that a practitioner will generally first collect a set of sample sounds, produce features for them, and train the detector to make the necessary distinctions through one or more well-established mathematical convergence methods. For purposes of illustrating a simple embodiment of the present invention, the depicted embodiment assumes that such sounds have been collected and have produced fixed detectors that can be carried into the software to actuate the detections. Certain embodiments of this training in the context of the invention will be described further herein.

This assumption of a fixed machine learning predictor is not a requirement, and having understood the critical elements of this invention, one can easily imagine an embodiment enabled to augment its training by receiving new examples in the field, in the actual environment of deployment. Such an embodiment can additionally adapt to the acoustics of the environment, any local sound reproduction devices such as televisions and music players, the typical human speakers in the environment, and even the physical layout as far as directionality of typical event types. This is contemplated and would result in an update to the same or similar operational modes as described herein.

Figure 2B:
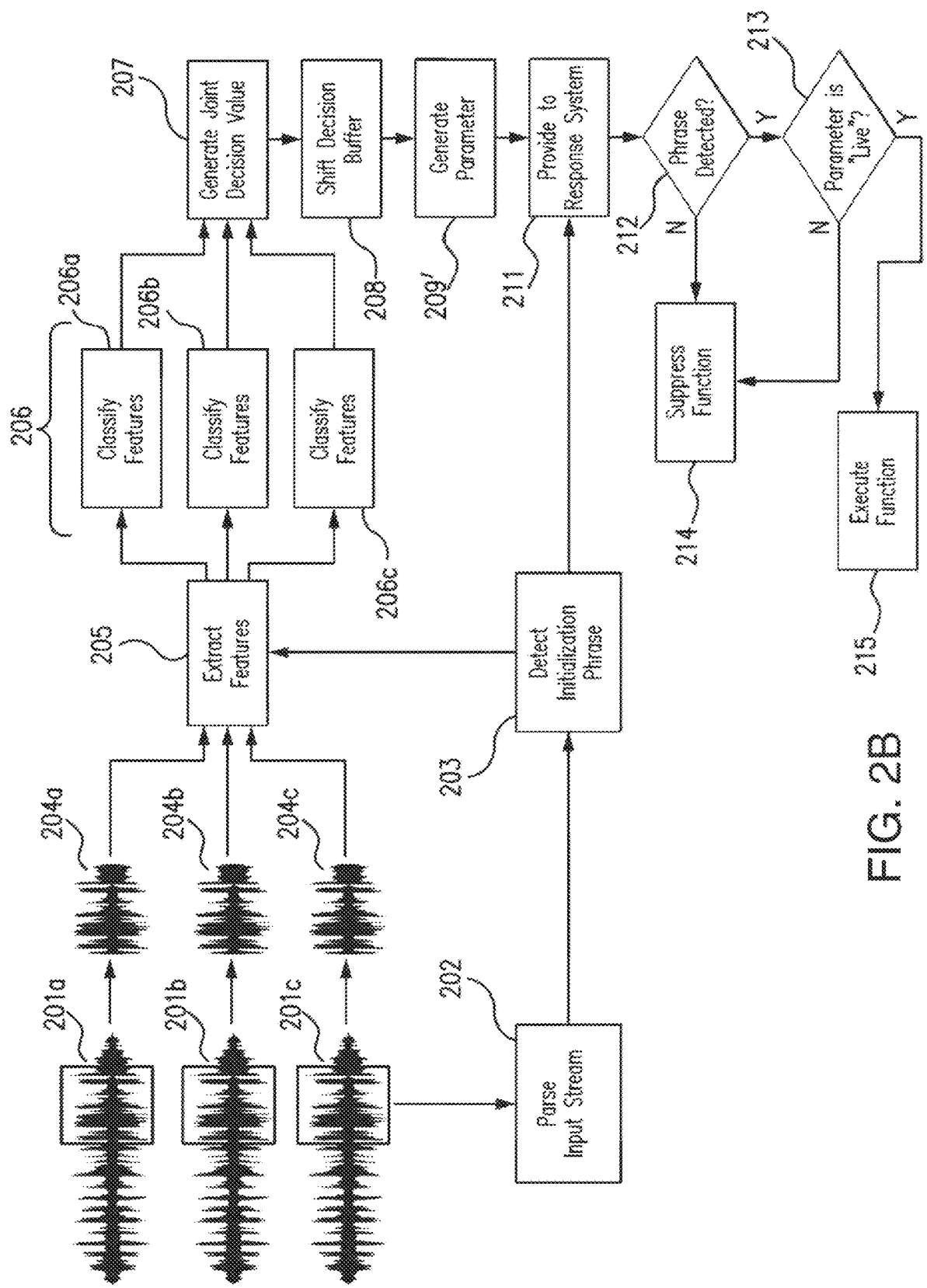
FIG. 2B is a flow diagram illustrating another flow of processes for source authentication in voice-controlled automation, in accordance with another exemplary embodiment of the present invention.
Figure 2C:
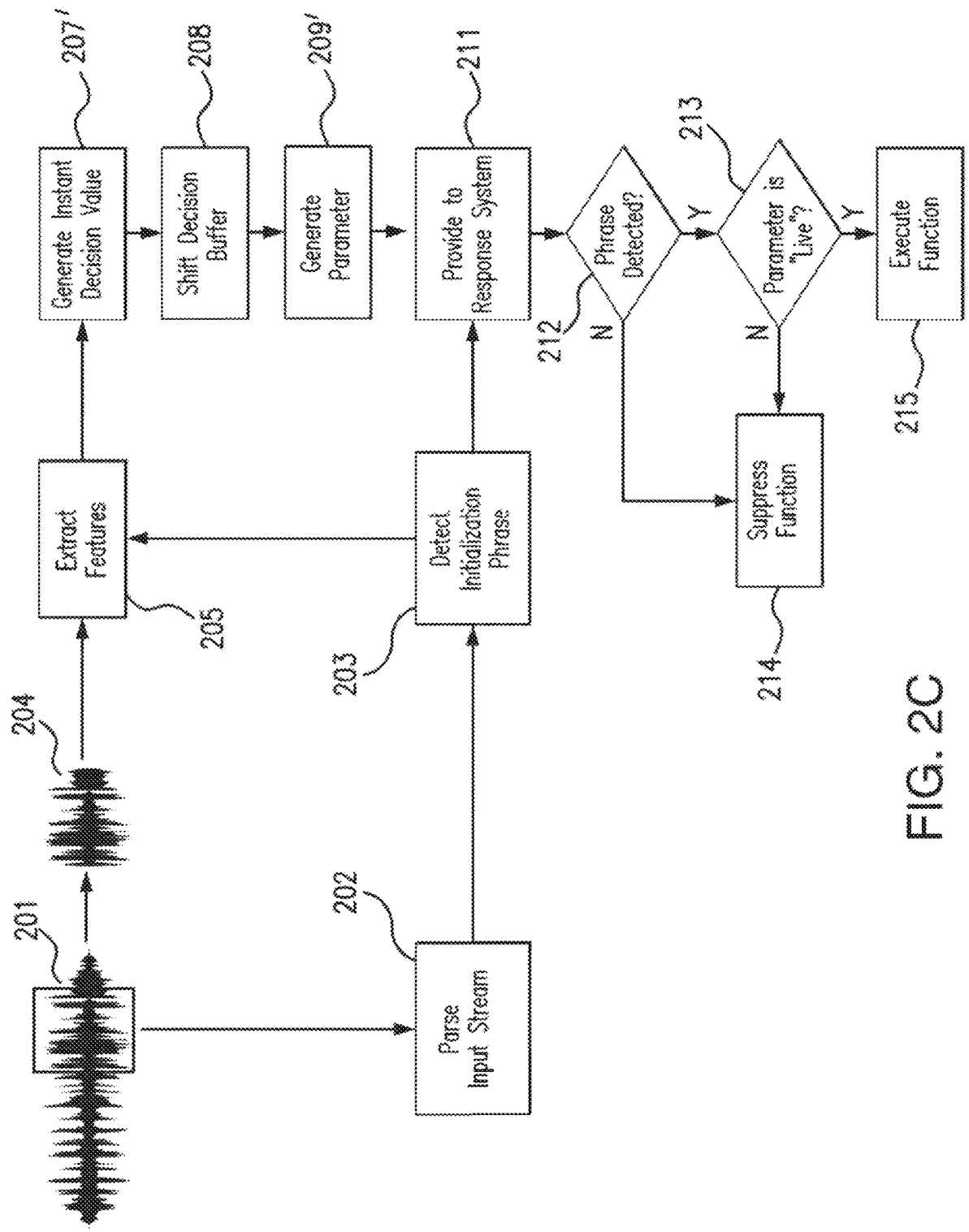
FIG. 2C is a flow diagram illustrating another flow of processes for source authentication in voice-controlled automation, in accordance with yet another exemplary embodiment of the present invention.

It is noted, of course, that the individual classification operations 206 depicted in the example embodiments of FIGS. 2A and 2B (and classifiers 131 depicted in FIG. 1D) may themselves be based on the machine learning algorithms described above, and may each produce their own conclusion as to the nature of the recently processed signal features in the form of individual decision values, which are further considered as previously described to arrive at a sound type parameter value.

In the other direction, it is within the scope of the invention that a single machine learning classifier generates the sound type parameter value directly, without use of any decision buffer.

Figure 3:
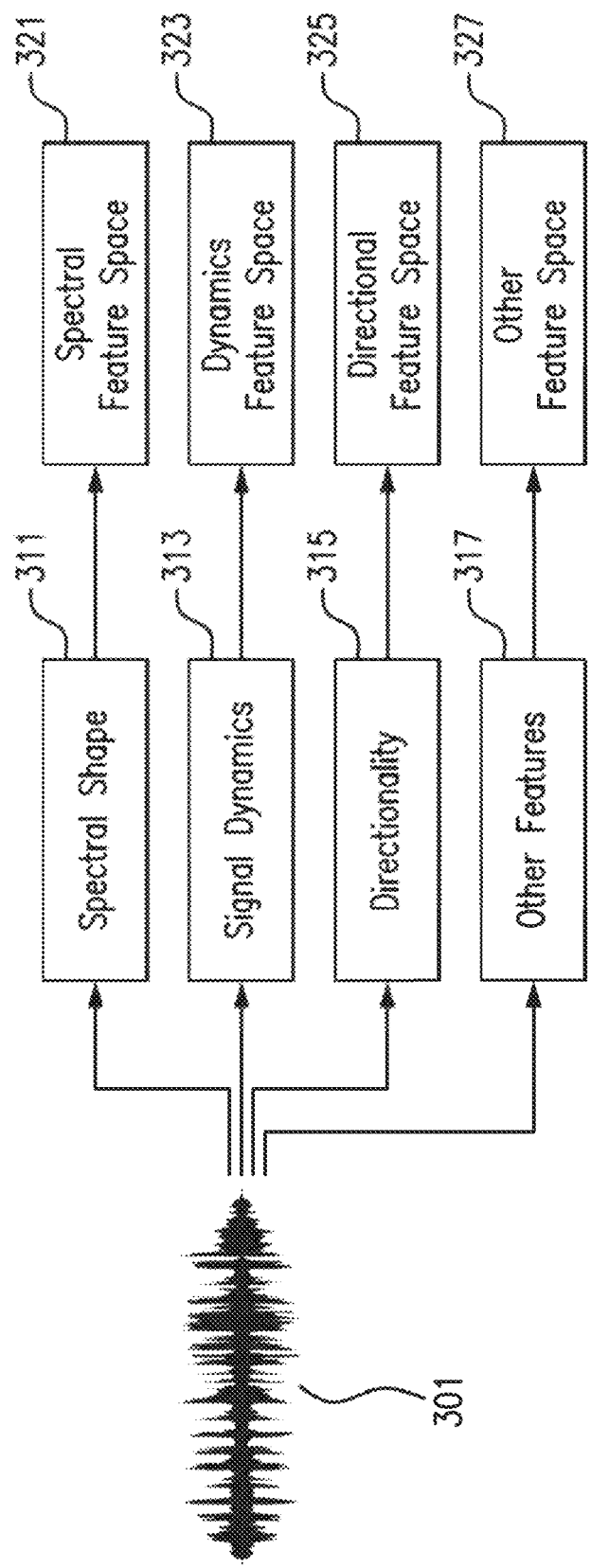
FIG. 3 illustrates exemplary extracted features of a digital stream in a capture channel, in accordance with an exemplary embodiment of the present invention.

FIG. 3 depicts extraction, from an audio signal 301, of certain specific feature spaces 321, 323, 325, 327 which have been proven to be useful in certain embodiments for discrimination. These preferably include the spectral shape 311 and dynamics 313, but without limitation may include other features 317 such as those described in the previous paragraphs. Both spectral shape 311 and dynamics 313 will, in a preferred embodiment, be normalized in some fashion to accommodate environmental sound level variations.

Spectral shape 311 has been determined to be helpful because transducers, speakers, and intervening processing of sound nearly always impart a significant change in emphasis, or relative energy in portions of the frequency spectrum, when compared to "raw" speech presently uttered by a human. For example, a small speaker tends to narrow the bandwidth of the sounds it emits, removing lower bass frequencies and reducing high frequencies relative to the middle frequency audio bands. The classic sound of a "telephone" voice is one example of this phenomenon. The spectral shape of a voice through a telephone improves intelligibility in many cases, but at the expense of high-fidelity accuracy and a "thin" or "tinny" sound. As another example, larger loudspeakers will typically have an enhanced bass frequency sound, due to the desirable aesthetic effects on music or soundtrack playback. On the recording end, microphones also have characteristic frequency responses. Some microphones are even tuned to add so-called "presence peaks," to emphasize desirable characteristics of a voice. These are examples to convey the concept, not a limitation or specific component of the invention. Further, the proximity and angle of a microphone are known to affect the frequency response as well. Finally, sound that is recorded or amplified is often processed to equalize it, again for either aesthetic or technical reasons. All these modifications serve to make live human speech generally have a different spectral balance than reproduced speech.

Similarly, signal dynamics 313 have also been determined to be a significant clue in distinguishing originally-generated speech from previously-transduced speech. In this context, signal dynamics refers to the changes between louder and quieter energy portions of the speech. All of the same devices and mechanisms described above will also impact the dynamics of a signal in most cases. Live vocals in a human are very textured, and at high resolution contain a great deal of dynamics over time. By contrast, through the limitations of resolution, or through deliberate processing such as audio compression, reproductions typically have less dynamical range and a more consistent energy over the speech. As will be understood by those versed in the art, there are interactions between amplitude dynamics and spectral content as well, which are in various embodiments captured by using a combination of these to make the desired distinction.

In certain embodiments, the system measures the magnitude of the spectrum normalized by the energy of the signal to measure spectral shape 311, and peak-to-RMS energy ratios such as crest factor at various points in the buffer or a smaller window thereof to analyze dynamics 313. However, it will be understood by those versed in signal processing of audio that many other methods exist for measuring dynamics and spectral shape, and that the need for normalization or not will vary between embodiments and applications. These examples are intended to provide a fully realized disclosure, but not to in anyway imply a limitation on the invention where other means might be suitably applied.

In certain embodiments the directionality of reception of the signals 315 will also be extracted for consideration. It is noted that, while spectral shape 311 and signal dynamics 313 are typically extracted by signal processing of the transduced signals or segments thereof, as briefly described above, information on the directionality 315 of a signal can also be "extracted" by other suitable methods which include but are not limited to "direction data tags" applied at the time the sound was transduced by the microphone or other transducer, and comparisons of amplitude or other features for the same sound as transduced through different microphones. All such suitable methods will be termed "extraction of directionality" for the purposes of this disclosure.

Directionality 315 is particularly sensitive to the monitored environment itself in what it implies, and the classifiers are preferably fine-tuned within that environment. It is preferable to establish, by manual configuration or machine learning, where relevant features in the environment are located relative to the receiving transducers. These relevant features can include, but are not limited to, locations more likely to contain people (and more specifically, people's mouths, as determined for instance by a floor level and a normal range of human heights), and locations known to contain a source of artificially reproduced sound (such as stereo speakers).

As previously noted, it is within the scope of the invention to also, or alternatively, distinguish speech or other sounds originating within a defined environment from speech or other sounds originating outside the same environment, for example to determine whether a user is present in the environment. In such embodiments, the natural physical acoustics of the environment will play a role in this distinction. The directionality 315 can in certain implementations suggest that a sound was received from an opening in an otherwise enclosed environment, such as a door or window, which in turn implies greater odds that the sound is from outside the environment. Meanwhile, muffling through surfaces, multipath echoes, damping of reflections, and so forth will introduce their own differences in both spectral balance 311 and dynamics 313. The directionality 315 preferably also plays an additional role as a factor in determining which of these environmental acoustics are likely to have altered the other features, and how. Thus, the techniques taught herein for resolving the main goal of "live" human discrimination, are applicable to "speech in the room" or "in the environment" type related applications.

The spectral shape 311, the signal dynamics 313, the directionality 315, and other extracted features 317 each produce a collection of one or more numerical values representative of the aspects of these features, as measured by the system. Respectively for each feature, these values are collectively termed the "features spaces" 321, 323, 325, 327 of the extracted features.

Figure 6:
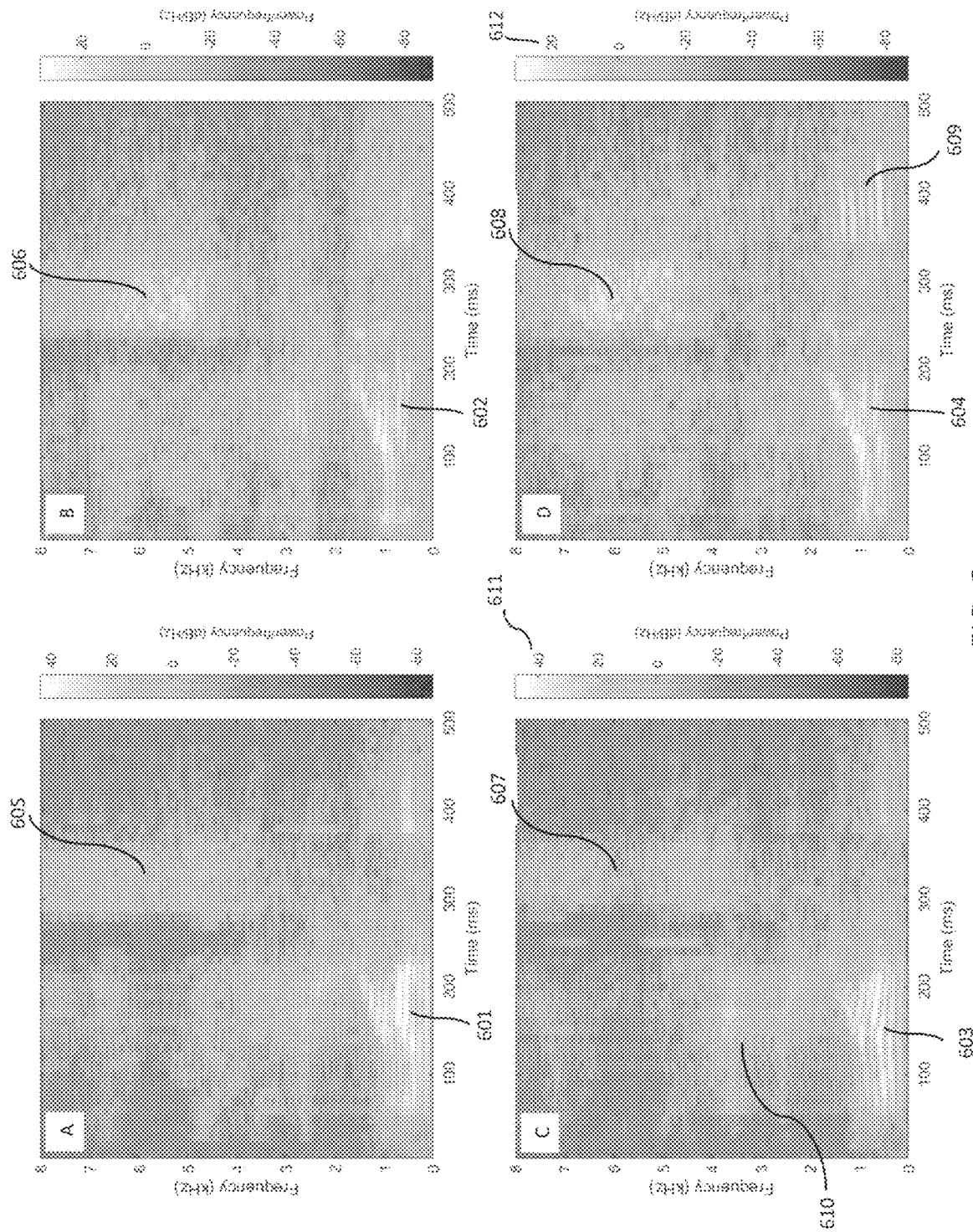
FIG. 6 illustrates spectrograms of exemplary sound segments and distinguishing features therein.

As an example of the distinctions between features of "live" and "reproduced" sound, FIG. 6 illustrates a comparison of direct and played back speech for a short "wake word" application. The comparison includes four spectrograms or plots, respectively labeled A-D, each displaying a series of short-time-Fourier-transforms arranged in time from left to right. This display, which is understood in speech and signal processing, represents a signal as a time-frequency distribution of power, with the brightness of each pixel corresponding to the power in a particular time-frequency bin. Thus, whiter pixels have more instant energy than darker pixels. The color scales to the right of each spectrogram display (e.g., 611, 612) show the range of power in dB/Hz. The signals are recorded at 16 kHz, and thus the frequency range is 0-8 kHz according to the theory of Nyquist band limits. The time range is 500 ms, about M second, which is the expected time necessary to utter the target wake word or initialization phrase for the particular application.

Each spectrogram represents an utterance of the initiation phrase. The raw utterance as recorded by the microphone and audio channel live with a human speaker is displayed on the left in spectrograms A and C, where A is a first instance of the utterance and C is a second instance. The spectrograms B and D on the right represent the same utterances as on the left, but first recorded on a smartphone and then played back into the same microphone and audio channel.

Thus, spectrograms A and B represent the same instance of the first wake word utterance, with A uttered live by a human and B recorded simultaneously with A, but then played back again from a smartphone. Likewise, C and D represent the same instance of the second utterance: C live from the human, D recorded and played back. This is in keeping with training and analysis described further herein with regard to FIG. 4.

Certain key distinctions between live and reproduced audio are made apparent in FIG. 6. A first distinction is apparent in the scale of the data. For example, it can be seen that the live recordings range from about −85 dB to +45 dB, as shown in the color scale 611, while the played-back audio ranges from −85 to about +30 dB, as shown in the color scale 612. The dynamic range of the live signal is about 15 dB larger than that of the pre-recorded signal. This is true both of the entire range of the data, as shown by the color scales 611 and 612, as well as of many specific frequency bands of the data (i.e., horizontal strips through the graph) and time slices (i.e., vertical strips through the graphs).

For example, if we consider region 601 of spectrogram A, we see a burst of harmonic energy from 0 to approximately 1.5 kHz corresponding the onset of the initiation phrase. This same energy in spectrogram B, in region 602, has both less dynamic range and less low frequency content. In this specific instance, the recording and playback process has cut energy below about 500 Hz and reduced the signal dynamics. Area 603 in spectrogram C and corresponding area 604 of spectrogram D show the same effects appearing in a second instance of the same utterance when it is recorded and played back.

This is a common effect of recording and playback of sounds. Microphones have a frequency response that is not perfectly flat, so sound spectra are modified. Microphones and input gain circuitry often work together to compress dynamic range—this serves to better fit live dynamics into the native range of the recording media (or digital bit depth) while maximizing signal to noise ratio (SNR) and preserving intelligibility.

Post processing on audio recordings to make them sound pleasing is generally based on the same sort of factors—tweaking the frequency spectrum and compressing or modifying dynamics. This is known as "EQ" or equalization and compression in the recording arts. Other modifications may perform multi-band compression, or various special effects (delay, reverb, etc.) which serve to modify the original signal in very detectable ways. Since balancing of levels for easy and comfortable listening is a primary goal of program production, it is common that dynamics will be suppressed, and spectral shape will be adjusted in compared to the original live sound. Thus, while this example shows only very simple record and playback, were this a produced broadcast or professional recorded and reproduced sound, the changes would be even more extreme from the original.

Finally, when reproducing of sound, any loudspeaker and its coupled amplifier circuit will further modify these sounds in the same features. Loudspeakers and amplifiers each have limits on their dynamic range and are tuned to work within a specific frequency range. Even high-fidelity sound systems with, for example, a frequency range of perhaps 50 Hz-20 kHz still will not reproduce the same range that a live sound can span. Nor will this response be "flat" across the frequency spectrum.

Returning to FIG. 6, we see that other comparisons in the live vs reproduced sounds can be observed. Consider that, in plots A and C, regions 605 and 607 are much less defined and lower energy than respective areas 606 and 608 in plots B and D. The reproduced recording not only loses dynamics and frequency detail in the low frequency range 0-1.5 kHz, but also gains artificial emphasis in the 4.5-6.5 kHz regions that is not in the original sound. The difference in dynamics can be examined within each band, by considering only the 4.5-6.5 kHz band rectangle alone, or the 0-1.5 kHz band rectangle alone, or, the difference in relative frequency emphasis can be considered over the entire frequency range.

In this illustrative example, a simple rule-based embodiment of the invention might consider looking for the presence of energy below 500 Hz in certain parts of the utterance as an indication of "live" sound. Likewise, a second rule might consider the relative emphasis of the 4.5-6.5 kHz bands to the 0-1.5 kHz bands. Such rules might function adequately within limited circumstances. However, preferentially a system and its classifiers will consider many more details, thus enabling the invention to generalize to distinguish live sound from not only this specific playback system, but many, many others.

Areas 609 and 610 show other regions of the spectrogram time-frequency dynamics that differ. There are numerous other more subtle differences as well, that cannot be easily seen in the grey-scale color ranges available for these plots. However, in certain embodiments, the numerous differences can nonetheless be analyzed mathematically and numerical differences defined, and can in other embodiments be learned and detected by a machine learning system.

This figure illustrates conceptually what is meant by spectral feature spaces or dynamic feature spaces. In certain embodiments, the spectrogram is used directly as a feature space to analyze both spectral shape and time-frequency dynamics jointly, as discussed here. In other embodiments, a frequency spectrum (e.g., FFT based) is used without regard to time dynamics. In still other embodiments, the dynamics are considered over time without specific regard to frequency. In yet other embodiments, filters (analog or digital) are applied, and relative energy considered in specific bands, and/or relative dynamic range considered in specific bands. In still others, computed parameters such as crest factor comprising a ratio of peak to RMS energy are used to quantify dynamics rather than absolute range. Other features are discussed in this specification, and related measures will be clear to those skilled in the art once the nature of the differences between live and reproduced sound as disclosed here are understood.

Figure 4:
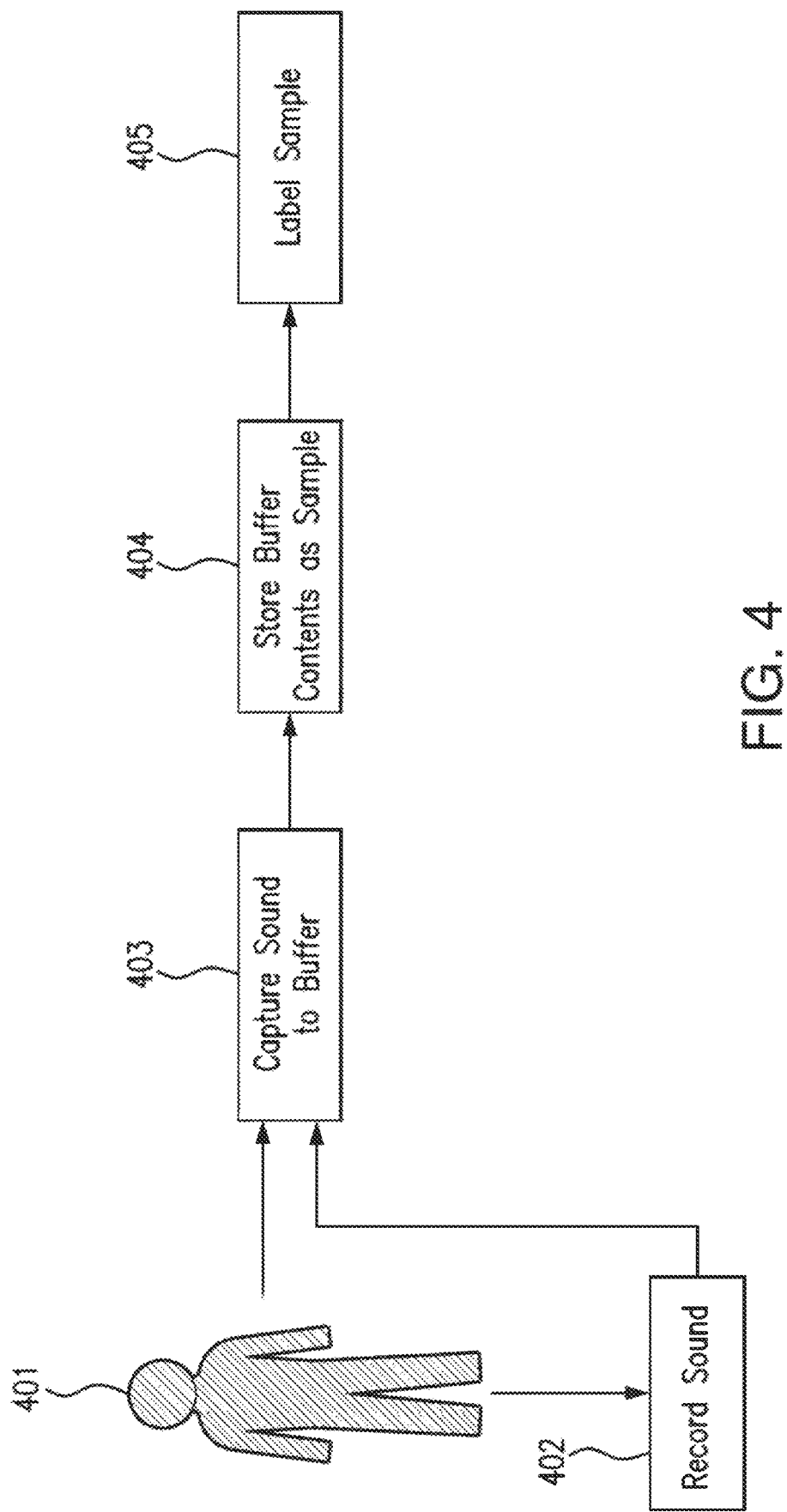
FIG. 4 is a flow diagram illustrating a flow of processes for building a training set of samples to train classifiers in a system for source authentication in voice-controlled automation, in accordance with an exemplary embodiment of the present invention.

FIG. 4 depicts a certain flow of operations to carry out a method for collecting training data for a machine learning classifier, according to an exemplary embodiment of the invention. In many embodiments, such collection occurs before deployment, but in other embodiments the collection may be enabled to work in live settings to update the training.

At operation 401, a human speaker is induced to make utterances comparable to those expected to be analyzed later during deployment of the system; that is, "target speech." If the target speech is an initialization phrase, then the speaker will utter this initialization phrase in many variations, at different distances, directions, and so forth from a microphone or other transducer. If the target speech is general speech, then a script of varied speech is used in a similar fashion. For simplicity of description and illustration, and without loss of generality, the description of FIG. 4 will assume the use of initialization phrases.

The live speech is captured through an input stream into a buffer at operation 403. In a preferred embodiment, this operation functions as it will during deployment of the system: for example, as described for operations 201-204 with reference to FIGS. 2A-2C. The example sound buffer contents will therefore be captured as they will be in the deployed state, so that a machine learning classifier learns to make appropriate distinctions on the sort of data that will occur at that time.

For similar reasons, it is preferable that all physical components, including the transducers and capture channel, be consistent if not identical with the system which will be deployed in the field. The characteristics of those physical components will affect the features of the signal, which the classifier will learn from in order to operate in the field. The accuracy of the trained detector depends in part upon factoring out the effects of the hardware, which is most easily achieved by using this same or similar hardware from the start of training.

Various buffer contents are individually stored as sound sample files in a storage device at operation 404, with labels applied to each such sample file at operation 405. The labels indicate that each sample file represents live speech, and preferably also provide other identifiers which will be useful later.

Simultaneously with the capture of the live speech at operation 403, the same audio is recorded to at least one other recording device at operation 402. After the appropriate live audio is captured, the recorded speech will be played back and likewise captured and stored through the same operations 403 and 404. During playback, the live user 401 will be replaced with one or more loudspeaker devices or other sound reproduction devices. At operation 405, the resulting sample files are labeled to indicate that each represents reproduced speech. Preferably, these labels also provide other identifiers that will allow the reproduced sample file to be paired with the live sample file containing the same moment of speech, for more precise comparisons and contrast. Thus, the training is controlled so that the only substantial difference between the two cases is that they are either live or reproduced sounds. Examples of this have been provided with respect to FIG. 6, described earlier herein.

Preferably, a plurality of external recording microphones, devices, and processing schemas are used and each played back into the system, to provide variation in challenge class training data. Also, multiple speakers are preferably captured in a similar fashion to provide a general training set, ideally of different speech tones, accents and so forth. It is also useful to additionally provide pre-recorded playback from other persons that are not be the same as those recorded live. This variance of training typically results in better generality in the deployed system. However, in certain applications, it will be expected that only a few users will need to successfully operate the system, in which case it is preferable to use only their voices for the training.

The resulting training set includes a plurality of audio samples with class labels. At least the classes of "live speech" and "reproduced speech" are preferably included, although in certain embodiments other suitable classes and subclasses are also provided. In certain embodiments, one-sided machine learning is employed to work with only one class of examples inferring the alternative class to be anything sufficiently different from the training set.

These and related processes, and other necessary instructions, are preferably encoded as executable instructions on one or more non-transitory computer readable media, such as hard disc drives or optical discs, and executed using one or more computer processors, in concert with an operating system or other suitable measures.

In a software implementation, the software includes a plurality of computer executable instructions, to be implemented on a computer system. Prior to loading in a computer system, the software preferably resides as encoded information on a suitable non-transitory computer-readable tangible medium, such as a magnetic floppy disk, a magnetic tape, CD-ROM, DVD-ROM, solid-state disk, flash memory device, or pre-existing data storage (such as "cloud storage") accessible through an operably coupled network means (such as the Internet).

In certain implementations, the invention includes a dedicated processor or processing portions of a system on chip (SOC), portions of a field programmable gate array (FPGA), or other such suitable measures, executing processor instructions for performing the functions described herein or emulating certain structures defined herein. Suitable circuits using, for example, discrete logic gates such as in an Application Specific Integrated Circuit (ASIC), Programmable Logic Array (PLA), or Field Programmable Gate Arrays (FPGA) are in certain embodiments also developed to perform these functions.

Figure 5:
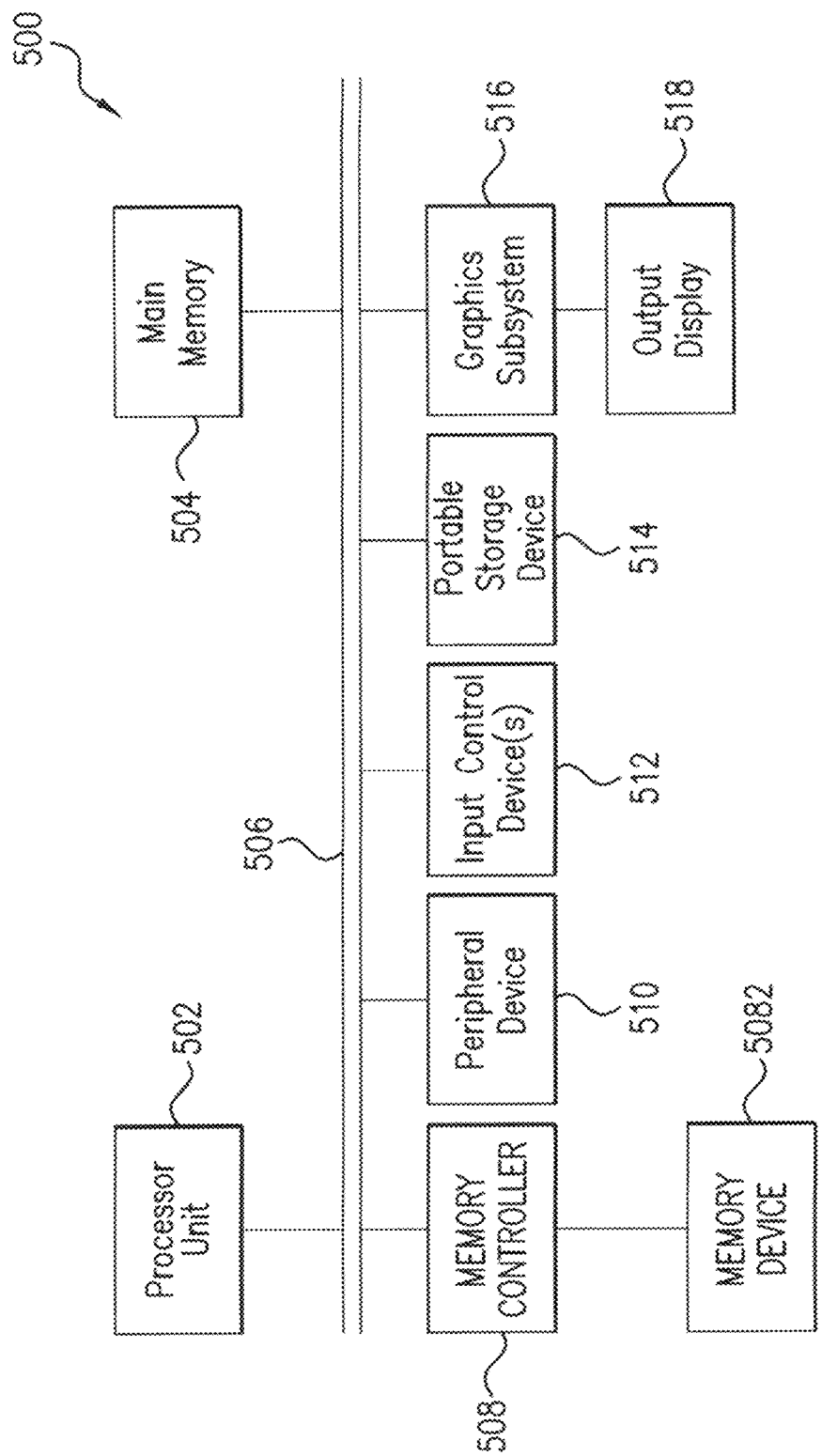
FIG. 5 is a block diagram illustrating an exemplary computer system for programmatic and/or hardware implementation of various embodiments and aspects of the present invention.

As an example, FIG. 5 is a block diagram illustrating an exemplary computer system for programmatic and/or hardware implementation of various aspects of the disclosed system and method. For instance, in various embodiments the system serves as a host for such hardware modules, and/or as a host for executing software modules such as electronic design automation (EDA) tools/simulations/emulation/firmware, in accordance with various configurations of the disclosed system and method.

According to certain embodiments, computer system 500 includes a processor unit 502, a main memory 504, an interconnect bus 506, a memory controller 508 that is coupled to a memory device 5082, peripheral device(s) 510, input control device(s) 512, portable storage medium drive(s) 514, a graphics subsystem 516, and an output display 518. Depending on the particular embodiment and the requirements of the intended application, all or only certain portions of the system components functionally shown may need actual implementation.

In various embodiments, processor unit 502 includes a single microprocessor or a plurality of microprocessors for configuring computer system 500 as a multi-processor system. Main memory 504 stores, in part, instructions and data to be executed by processor unit 502. Main memory 504 preferably includes banks of dynamic random access memory (DRAM) as well as high-speed cache memory.

For the purpose of simplicity, the components of computer system 500 are depicted to be interconnected via interconnect bus 506. However, in alternate embodiments, computer system 500 is interconnected through one or more data transport means. For example, in certain embodiments, processor unit 502 and main memory 504 are interconnected via a local microprocessor bus; and memory controller 508, peripheral device(s) 510, portable storage medium drive(s) 514, and graphics subsystem 516 are interconnected via one or more input/output (I/O) buses. Memory device 5082 is preferably implemented as a nonvolatile semiconductor memory for storing data and instructions to be used by processor unit 502. Memory device 5082 preferably stores the software to load it to the main memory 504, but in alternate embodiments is represented in an EDA tool simulation by suitable classes (incorporating data structures and functions operable upon the data structures) or the like as would be known to one of skill in the art.

Portable storage medium drive 514 operates to input and output data and code to and from the computer system 500. In one configuration, the software is stored on such a portable medium, and is input to computer system 500 via portable storage medium drive 514. In various embodiments, peripheral device(s) 510 includes any type of computer support device such as an input/output (I/O) interface, to add additional functionality to computer system 500. For example, in certain embodiments, peripheral device(s) 510 includes a network interface card, to interface computer system 500 to a network. In certain embodiments, peripheral device(s) also includes a memory controller and nonvolatile memory.

Input control device(s) 512 provide a portion of the user interface for a computer system 500 user. In various embodiments, input control device(s) 512 includes an alphanumeric keypad for inputting alphanumeric and other key information; and a cursor control device such as a mouse, a trackpad or stylus; or cursor direction keys.

In order to display textual and graphical information, computer system 500 includes graphics subsystem 514 and output display(s) 518. In various embodiments, output display 518 includes a cathode ray tube (CRT) display, liquid crystal display (LCD), plasma, or active matrix organic light emitting diode (AMOLED) display. Graphics subsystem 516 receives textual and graphical information, and processes the information for output to display 518.

The descriptions above are intended to illustrate possible implementations of the disclosed system and method, and are not restrictive. While this disclosure has been made in connection with specific forms and embodiments thereof, it will be appreciated that various modifications other than those discussed above may be resorted to without departing from the spirit or scope of the disclosed system and method. Such variations, modifications, and alternatives will become apparent to the skilled artisan upon a review of the disclosure. For example, functionally equivalent elements or method operations are substitutable for those specifically shown and described, and certain features are usable independently of other features. Additionally, in various embodiments, all or some of the above embodiments are selectively combined with each other, and particular locations of elements or sequence of method operations are reversed or interposed, all without departing from the spirit or scope of the disclosed system and method as defined in the appended claims. The scope should therefore be determined with reference to the description above and the appended claims, along with their full range of equivalents.

What is claimed is:

1. A system for discriminating sound verbalized by a live source within a monitored setting for authenticating voice controlled automation of a responsive process, comprising:
   at least one sound capturing input channel generating a digital stream representing sound signals emitted within the monitored setting and received thereby; and
   a classification processor coupled to the sound capturing input channel, the classification processor executing to generate a sound type classification for the digital stream responsive to extraction of at least one of a plurality of predetermined signal features of the digital stream and generating at least one decision value based on the at least one extracted at least one signal features, the classification processor including a status generator computing the sound type classification for the digital stream according to an aggregate score of one or more of the generated decision values;
   wherein received sound signals verbalized by a live source are discriminately indicated according to the sound type classification to authenticate voice controlled actuation of the responsive process based thereon.

2. A method for discriminating sound verbalized by a live source within a monitored setting, comprising:
   receiving a stream of a digitized sound input;
   extracting at least one of a plurality of signal features of successive portions of the stream of digitized sound input;
   generating at least one speech decision value in correspondence to the at least one of the plurality of signal features for each of the successive portions of the stream of digitized sound input;
   generating an aggregate score of the generated decision values;
   generating a speech type parameter according to the generated aggregate score; and
   triggering at least one function of a response system responsive to the generated speech type parameter being indicative of a live vocal input represented in the digital stream.

* * * * *